United States Patent
Yamashita et al.

(10) Patent No.: US 9,065,612 B2
(45) Date of Patent: Jun. 23, 2015

(54) WIRELESS TRANSMISSION METHOD, WIRELESS TRANSMISSION SYSTEM, AND TRANSMISSION APPARATUS AND RECEPTION APPARATUS OF WIRELESS TRANSMISSION SYSTEM

(75) Inventors: Fumihiro Yamashita, Yokosuka (JP); Junichi Abe, Yokosuka (JP); Kiyoshi Kobayashi, Yokosuka (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 825 days.

(21) Appl. No.: 13/256,676
(22) PCT Filed: Mar. 31, 2010
(86) PCT No.: PCT/JP2010/002356
§ 371 (c)(1),
(2), (4) Date: Sep. 15, 2011
(87) PCT Pub. No.: WO2010/113499
PCT Pub. Date: Oct. 7, 2010

(65) Prior Publication Data
US 2012/0002703 A1    Jan. 5, 2012

(30) Foreign Application Priority Data
Apr. 1, 2009 (JP) .................................. 2009-088857

(51) Int. Cl.
*H04K 1/10* (2006.01)
*H04L 5/00* (2006.01)
*H04L 27/26* (2006.01)

(52) U.S. Cl.
CPC .......... *H04L 5/0044* (2013.01); *H04L 27/2614* (2013.01); *H04L 27/264* (2013.01); *H04L 27/2647* (2013.01); *H04L 27/2634* (2013.01)

(58) Field of Classification Search
CPC ......... H04B 1/40; H04B 1/69; H04L 27/2647
USPC .......................... 375/242, 260, 139; 380/269
See application file for complete search history.

(56) References Cited

U.S. PATENT DOCUMENTS 4,817,141 A * 3/1989 Taguchi ........................ 380/269
6,714,529 B1 3/2004 Tanabe et al.
(Continued)

FOREIGN PATENT DOCUMENTS

| JP | 2000-49744 A | 2/2000 |
| JP | 2001-051975 A | 2/2001 |

(Continued)

OTHER PUBLICATIONS

Jun-ichi Abe et al., "Bandwidth Decomposition Employing Spectrum Editing Technique for High Frequency Utilization Efficiency", IEICE Technical Report, vol. 109, No. 340, Dec. 10, 2009, pp. 7 to 12, SAT2009-48, with its English translation.

(Continued)

*Primary Examiner* — Daniel Washburn
*Assistant Examiner* — Fitwi Hailegiorgis
(74) *Attorney, Agent, or Firm* — Harness, Dickey & Pierce, P.L.C.

(57) ABSTRACT

In a wireless transmission system that transmits and receives a modulated signal between a transmitter and a receiver that are coupled through a wireless transmission path, the transmitter includes a spectrum division filter bank dividing the modulated signal and generating a plurality of sub-spectrum signals each of which is arranged at a predetermined frequency position, and subjects the plurality of sub-spectrum signals arranged in spectra to a direct spectrum division transmission, and the receiver includes a spectrum combination filter bank extracting the plurality of sub-spectrum signals from the received signals arranged in spectra and subjected to the direct spectrum division transmission to combine the sub-spectrum signals into an original modulated signal.

26 Claims, 24 Drawing Sheets

(56) References Cited

U.S. PATENT DOCUMENTS

| | | | |
|---|---|---|---|
| 6,940,893 B1* | 9/2005 | Pinkney et al. | 375/139 |
| 2005/0041746 A1* | 2/2005 | Rosen et al. | 375/242 |
| 2009/0262758 A1 | 10/2009 | Kobayashi et al. | |

FOREIGN PATENT DOCUMENTS

| | | |
|---|---|---|
| JP | 2001-111639 A | 4/2001 |
| JP | 2002-084244 A | 3/2002 |
| WO | 2008/050766 A1 | 5/2008 |

OTHER PUBLICATIONS

Yamashita, F. et al., Polarization Tracking Free Ku Broadband Mobile Satellite Communications System-Variable Polarization Frequency Division Multiplexing (VPFDM), Advanced Satellite Mobile Systems, 2008. ASMS 2008. 4$^{th}$, Aug. 26, 2008, pp. 60-65.

Makoto Taromaru et al., "Proposal of Band-Limited Spectrum-Division Single Carrier Transmission for Dynamic Spectrum Access in ISM Band", IEICE Technical Report, vol. 109, No. 61, May 21, 2009, pp. 7 to 12, SR2009-1-SR2009-21, with its English translation.

Jun-ichi Abe et al., "A Proposal of Bandwidth Decomposition Employing Spectrum Editing Technique", The 2009 Society Conference of the Institute of Electronics, Information and Communication Engineers, B-3-11, p. 263, with its English translation.

Jun-ichi Abe et al., "A Study on Phase Compensation for Bandwidth Decomposition Signal Transmission Employing Spectrum Editing Technique", the 2010 General Conference of the Institute of Electronics, Information and Communication Engineers, B-3-11, p. 324, with its English translation.

Tanabe, Motohiro, et al., "A Novel Dynamic Channel Access Scheme Using Overlap FFT Filter-bank for Cognitive Radio," IEICE Technical Report, SR2008-99, pp. 65-70, Mar. 2009.

* cited by examiner

Fig. 20
(a) EXAMPLE OF THREE OR MORE DIVIDED SPECTRA
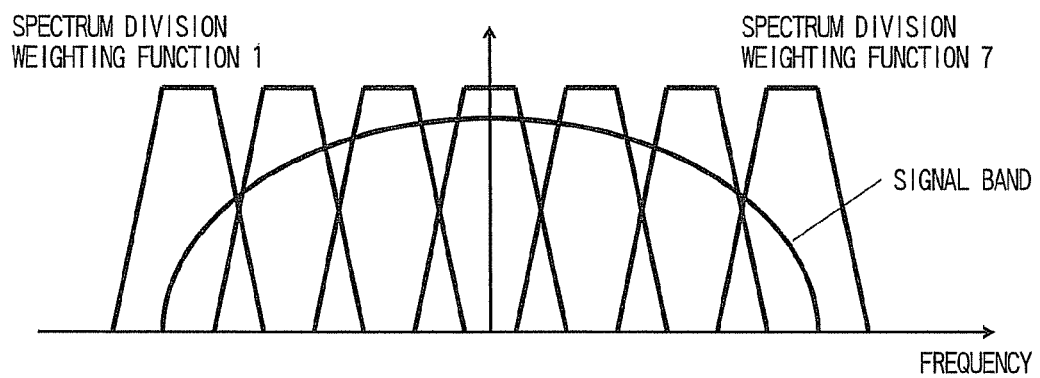
(b) EXAMPLE OF VARIABLE LENGTH OF DIVIDED SPECTRA
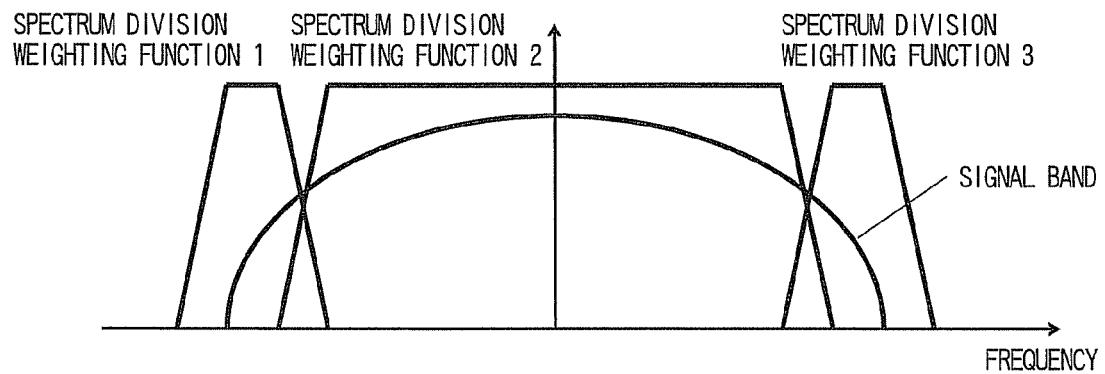

(a) MODULATED SIGNAL BAND<SUM OF BANDS OCCUPIED BY SUB-SPECTRUM SIGNALS (b) MODULATED SIGNAL BAND>SUM OF BANDS OCCUPIED BY SUB-SPECTRUM SIGNALS

PRIOR ART     Fig. 26

PRIOR ART
Fig. 27
(a)
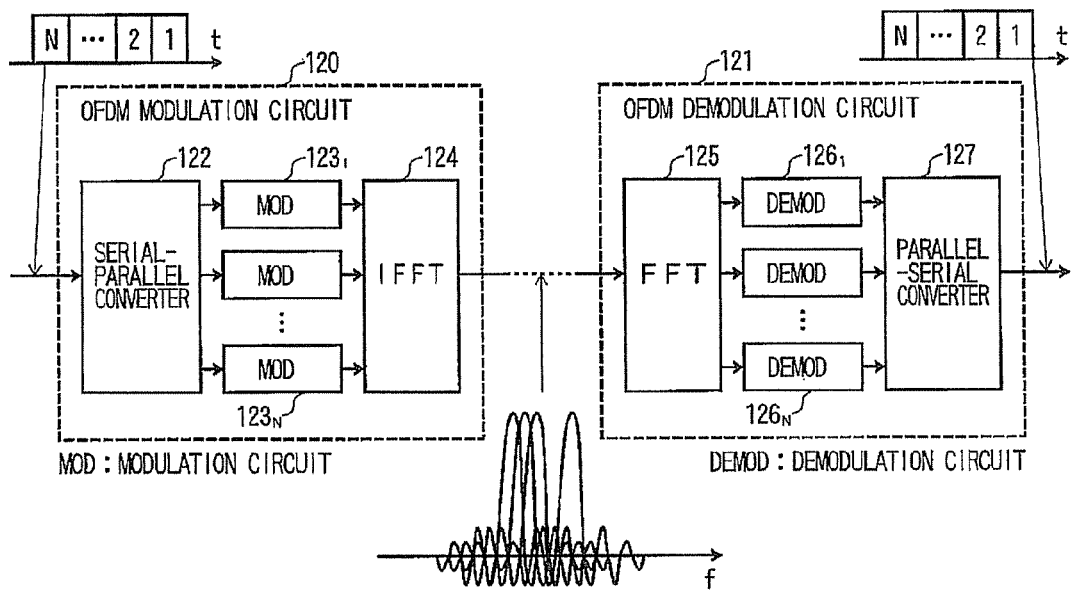
(b)
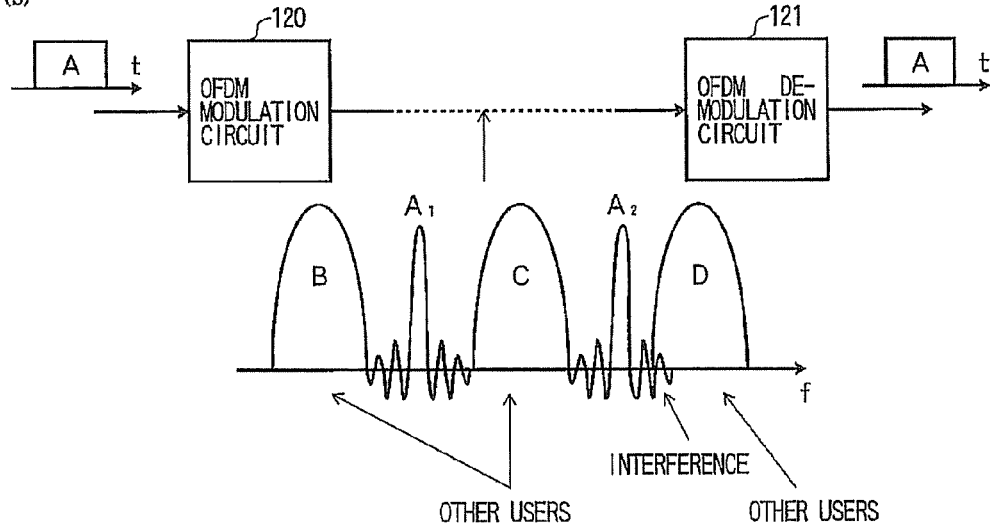

WIRELESS TRANSMISSION METHOD, WIRELESS TRANSMISSION SYSTEM, AND TRANSMISSION APPARATUS AND RECEPTION APPARATUS OF WIRELESS TRANSMISSION SYSTEM

CROSS REFERENCE TO RELATED APPLICATION

This application is a U.S. National Stage application claiming the benefit of prior filed International Application Number PCT/JP2010/002356, filed on Mar. 31, 2010, in which the International Application claims priority from Japanese Patent Application Number 2009-088857, filed on Apr. 1, 2009, the entire contents of which are incorporated herein by reference.

TECHNICAL FIELD

The present invention relates to a wireless transmission method, a wireless transmission system, and a transmitter and a receiver of the wireless transmission system by which a plurality of users efficiently use a limited frequency band to perform wireless communication.

BACKGROUND ART

FIG. 25 shows a first exemplary configuration of a conventional multicarrier transmission system (Patent Document 1).

In FIG. 25, a transmitter of the conventional multicarrier transmission circuit includes modulation circuits $100_1$ to $100_N$ for each user, a Tx filter bank 101 and a transmitting circuit 102. A receiver includes a receiving circuit 103, an Rx filter bank 104 and demodulation circuits $105_1$ to $105_N$ for each user.

The modulation circuits $100_1$ to $100_N$ in the transmitter modulate (map) data 1 to N for each user, respectively. The Tx filter bank 101 converts respective modulated signals to respective predetermined carrier frequencies, which are in turn combined and transmitted by the transmitting circuit 102. The Rx filter bank 104 in the receiver filters multicarrier signals received at the receiving circuit 103 for each carrier frequency, and the demodulation circuits $105_1$ to $105_N$ demodulate data 1 to N for each user, respectively.

FIG. 26 shows a second exemplary configuration of a conventional multicarrier transmission system. Here, an example is shown in which, in the conventional multicarrier transmission system shown in FIG. 25, a user A uses an unused frequency band to transmit a signal when other users B, C and D have already occupied frequency bands for communication.

A serial-parallel converter 110 in the transmitter serial-to-parallel converts data for the user A, modulation circuits $111_1$ and $111_2$ modulate serial-parallel converted data, respectively. A Tx filter bank 112 converts each of modulated signals $A_1$ and $A_2$ for the user A to a predetermined carrier frequency, so as to be allocated to an unused frequency band and transmitted by a transmission circuit 113. Meanwhile, an Rx filter bank 115 in the receiver filters multicarrier signals received at a receiving circuit 114 for each carrier frequency for frequency conversion, and demodulation circuits $116_1$ to $116_2$ demodulate modulated signals $A_1$ and $A_2$ for the user A, respectively. The demodulated modulated signals $A_1$ and $A_2$ are parallel-serial converted by a parallel-serial converter 117 and restored to data for the user A.

FIG. 27 shows an exemplary configuration of a conventional orthogonal frequency division multiplexing (OFDM) transmission system.

In FIG. 27(a), a conventional OFDM transmission system includes an OFDM modulation circuit 120 on the transmission side, and an OFDM demodulation circuit 121 on the reception side. The OFDM modulation circuit 120 includes a serial-parallel converter 122, modulation circuits $123_1$ to $123_N$ and an inverse fast Fourier transform (IFFT) circuit 124. The OFDM demodulation circuit 121 includes a fast Fourier transform (FFT) circuit 125, demodulation circuits $126_1$ to $126_N$ and a parallel-serial converter 127.

Usually, with the orthogonal frequency division multiplexing-time division multiple access (OFDM-TDMA) scheme, which divides users' signals into time slots to distinguish the users according to time, the users' signals that are divided into time slots are serial-to-parallel converted by the serial-parallel converter 122, and each of the parallel-output signals is modulated by each of the modulation circuits $123_1$ to $123_N$, independently. Subsequently, the parallel-output modulated signals are converted to time domain by the IFFT circuit 124, and transmitted as multicarrier signals.

Meanwhile, in the OFDM demodulation circuit 121, after establishing OFDM frame synchronization, the signals are converted to frequency domain by the FFT circuit 125, and demodulated by the demodulation circuits $126_1$ to $126_N$ for each sub carrier. The demodulated signals are input into the parallel-serial converter 127, and restored from per-sub carrier signals to the original one-system signals.

RELATED ART DOCUMENT

Patent Document

Patent Document 1: Japanese Patent No. 3299952

DISCLOSURE

Problems to be Solved

The conventional multicarrier transmission system shown in FIG. 26 requires as many modulation circuits and demodulation circuits as the number of carriers into which a user signal is divided. In addition, a serial-parallel converter and a parallel-serial converter require suitable amount of memory for the number of carriers into which a user signal is divided, leading to a problem that a circuit size becomes large.

Meanwhile, in an OFDM transmission system shown in FIG. 27, a plurality of modulation circuits and demodulation circuits are required, and an OFDM signal presents an SINC function response in a frequency domain so that sub carriers become orthogonal. Accordingly, as shown in FIG. 27(b), there is the problem that, when a signal for a user A is divided into spectra, a side lobe becomes superposed with an adjacent, another user signal, causing interferences. If a sufficient guard band is provided between the OFDM signal and the signal of the other user in order to avoid this problem, a problem occurs that frequency utilization efficiency is degraded.

A proposition of the present invention is to provide a wireless transmission method, a wireless transmission system, and a transmitter and a receiver of the wireless transmission system by which direct spectrum division transmission of one modulated signal is achieved at a small circuit size, allowing unused frequency bands of a transmission path to be used efficiently.

Means for Solving the Problems

According to a first invention, in a wireless transmission system that transmits and receives a modulated signal between a transmitter and a receiver that are coupled through a wireless transmission path, the transmitter includes a spectrum division filter bank dividing the modulated signal and generating a plurality of sub-spectrum signals each of which is arranged at a predetermined frequency position, and subjects the plurality of sub-spectrum signals arranged in spectra to a direct spectrum division transmission, and the receiver includes a spectrum combination filter bank extracting the plurality of sub-spectrum signals from the received signals arranged in spectra and subjected to the direct spectrum division transmission to combine the sub-spectrum signals into an original modulated signal.

The spectrum division filter bank D1 in the wireless transmission system according to the first invention includes a Fourier transform unit converting the modulated signal to frequency domain; a plurality of spectrum division units dividing an output from the Fourier transform unit and outputting the plurality of sub-spectrum signals; a plurality of frequency shift units shifting each of the plurality of sub-spectrum signals output from the plurality of spectrum division units to the predetermined frequency position; an addition unit performing an addition of outputs from the plurality of frequency shift units, and arranging each of the outputs at the predetermined frequency position; and an inverse Fourier transform unit converting an output from the addition unit to time domain.

The spectrum division filter bank D2 in the wireless transmission system according to the first invention includes a Fourier transform unit converting the modulated signal to frequency domain; a plurality of frequency shift units each shifting an output from the Fourier transform unit to the predetermined frequency position; a plurality of spectrum division units dividing each output from the plurality of frequency shift units and outputting the plurality of sub-spectrum signals; an addition unit performing an addition of outputs from the plurality of spectrum division units, and arranging each of the outputs at the predetermined frequency position; and an inverse Fourier transform unit converting an output from the addition unit to time domain.

The spectrum combination filter bank C1 in the wireless transmission system according to the first invention includes a Fourier transform unit converting the received signals to frequency domain; a plurality of spectrum extraction units dividing an output from the Fourier transform unit and extracting the plurality of sub-spectrum signals; a plurality of frequency shift units shifting each of the plurality of sub-spectrum signals output from the plurality of spectrum extraction units to an original frequency position where each of the sub-spectrum signals is at before arranged to the predetermined frequency position; an addition unit performing an addition of outputs from the plurality of frequency shift units, and combining the outputs at the original frequency position; and an inverse Fourier transform unit converting an output from the addition unit to time domain.

The spectrum combination filter bank C2 in the wireless transmission system according to the first invention includes a Fourier transform unit converting the received signals to frequency domain; a plurality of frequency shift units each shifting an output from the Fourier transform unit from the predetermined frequency position to an original frequency position where each of the sub-spectrum signals is at before arranged to the predetermined frequency position; a plurality of spectrum extraction units dividing each output from the plurality of frequency shift units and extracting the plurality of sub-spectrum signals; an addition unit performing an addition of outputs from the plurality of spectrum extraction units, and combining the outputs at the original frequency position; and an inverse Fourier transform unit converting an output from the addition unit to time domain.

According to a second invention, the transmitter and the receiver in the wireless transmission system of the first invention transmit the plurality of sub-spectrum signals through respective wireless transmission paths.

The spectrum division filter bank D1' in the wireless transmission system according to the second invention includes a Fourier transform unit converting the modulated signal to frequency domain; a plurality of spectrum division units dividing an output from the Fourier transform unit and outputting the plurality of sub-spectrum signals; a plurality of frequency shift units shifting each of the plurality of sub-spectrum signals output from the plurality of spectrum division units to the predetermined frequency position, and output each of the plurality of sub-spectrum signals arranged at the predetermined frequency position; and a plurality of inverse Fourier transform units that convert each output from the plurality of frequency shift units to time domain.

The spectrum division filter bank D2' in the wireless transmission system according to the second invention includes a Fourier transform unit converting the modulated signal to frequency domain; a plurality of frequency shift units each shifting an output from the Fourier transform unit to the predetermined frequency position; a plurality of spectrum division units dividing each output from the plurality of frequency shift units and outputting each of the plurality of sub-spectrum signals arranged at the predetermined frequency position; and a plurality of inverse Fourier transform units converting each output from the plurality of spectrum division units to time domain.

The spectrum combination filter bank C1' in the wireless transmission system according to the second invention includes a plurality of Fourier transform units converting each of received signals transmitted through the plurality of wireless transmission paths to frequency domain; a plurality of spectrum extraction units dividing each output from the plurality of Fourier transform units and extracting the plurality of sub-spectrum signals; a plurality of frequency shift units shifting each of the plurality of sub-spectrum signals output from the plurality of spectrum extraction units to an original frequency position where each of the sub-spectrum signals is at before arranged to the predetermined frequency position; an addition unit performing an addition of outputs from the plurality of frequency shift units, and combining the outputs at the original frequency position; and an inverse Fourier transform unit converting an output from the addition unit to time domain.

The spectrum combination filter bank C2' in the wireless transmission system according to the second invention includes a plurality of Fourier transform units converting each of received signals transmitted through the plurality of wireless transmission paths to frequency domain; a plurality of frequency shift units shifting each output from the plurality of Fourier transform units from the predetermined frequency position to an original frequency position where each of the sub-spectrum signals is at before arranged to the predetermined frequency position; a plurality of spectrum extraction units dividing each output from the plurality of frequency shift units and extracting the plurality of sub-spectrum signals; an addition unit performing an addition of outputs from the plurality of spectrum extraction units, and combining the outputs at the original frequency position; and an inverse Fourier transform unit converting an output from the addition unit to time domain.

The spectrum division units in each of the spectrum division filter banks D1, D1', D2 and D2' in the wireless transmission system according to the first invention or second invention each multiplies the modulated signal by more than one spectrum division weighting function $BD_k(\omega)$ to generate N sub-spectrum signals $Sb_k(\omega)$. The spectrum extraction units in each of the spectrum combination filter banks C1, C1', C2 and C2' in the wireless transmission system according to the first invention or second invention each multiplies N sub-spectrum signals $Sb_k(\omega)$ contained in the received signals by a spectrum combination weighting function $BC_k(\omega)$ corresponding to a transfer function $G(\omega)$ between the transmitter and the receiver and the spectrum division weighting function $BD_k(\omega)$, where k represents a natural number from 1 to N, N represents the number of divided spectra and $\omega$ represents a frequency.

In addition, preferably, an overall transfer function $BT_k(\omega)$ that is the product of the spectrum division weighting function $BD_k(\omega)$ and the spectrum combination weighting function $BC_k(\omega)$ in an occupied spectrum of the modulated signal is represented as follows:

$$\Sigma |BT_k(\omega)G(\omega+\omega_k)|=A$$

where A represents a constant and $\omega_k$ represents a value determined by the frequency allocation of the sub-spectrum signal.

In addition, preferably, the spectrum division weighting function $BD_k(\omega)$ and the spectrum combination weighting function $BC_k(\omega)$ making up a pair are both the same root roll-off function.

Further, preferably, the product of a mean frequency spectrum $F(\omega)$ of the modulated signal and the spectrum division weighting function $BD_k(\omega)$ satisfies $$|F(\omega)BD_k(\omega)G(\omega+\omega_k)|=|BC_k(\omega)|$$

and the spectrum combination weighting function $BC_k(\omega)$ is a root roll-off function.

According to a third invention, the transmitter in the wireless transmission system of the first invention includes spectrum division filter banks D1 and D2.

According to a fourth invention, the transmitter in the wireless transmission system of the second invention includes spectrum division filter banks D1' and D2'.

According to a fifth invention, the receiver in the wireless transmission system of the first invention includes spectrum combination filter banks C1 and C2.

According to a sixth invention, the receiver in the wireless transmission system of the second invention includes spectrum combination filter banks C1' and C2'.

According to the seventh invention, in a wireless transmission method that transmits and receives a modulated signal between a transmitter and a receiver that are coupled through a wireless transmission path, the transmitter uses a spectrum division filter bank to divide the modulated signal, generates transmitted signals from a plurality of sub-spectrum signals each of which is arranged at a predetermined frequency position, and subjects the plurality of sub-spectrum signals arranged in spectra to a direct spectrum division transmission, and the receiver uses a spectrum combination filter bank to extract the plurality of sub-spectrum signals from received signals arranged in spectra and subjected to the direct spectrum division transmission to combine the sub-spectrum signals into an original modulated signal, which is in turn subjected to demodulation processing.

The spectrum division filter bank in the wireless transmission method according to the seventh invention converts the modulated signal to frequency domain by a Fourier transform unit; divides an output from the Fourier transform unit and outputs the plurality of sub-spectrum signals by a plurality of spectrum division units; shifts each of the plurality of sub-spectrum signals output from the plurality of spectrum division units to the predetermined frequency position by a plurality of frequency shift units; performs an addition of outputs from the plurality of frequency shift units, and arranges each of the outputs at the predetermined frequency position by an addition unit; and converts an output from the addition unit to time domain by an inverse Fourier transform unit.

The spectrum division filter bank in the wireless transmission method according to the seventh invention converts the modulated signal to frequency domain by a Fourier transform unit; shifts an output from the Fourier transform unit to the predetermined frequency position by each of a plurality of frequency shift units; divides each output from the plurality of frequency shift units and outputs the plurality of sub-spectrum signals by a plurality of spectrum division units; performs an addition of outputs from the plurality of spectrum division units, and arranges each of the outputs at the predetermined frequency position by an addition units; and converts an output from the addition unit to time domain by an inverse Fourier transform unit.

The spectrum combination filter bank in the wireless transmission method according to the seventh invention converts the received signals to frequency domain by a Fourier transform unit; divides an output from the Fourier transform unit and extracts the plurality of sub-spectrum signals by a plurality of spectrum extraction units; shifts each of the plurality of sub-spectrum signals output from the plurality of spectrum extraction units to an original frequency position where each of the sub-spectrum signals is at before arranged to the predetermined frequency position by a plurality of frequency shift units; performs an addition of outputs from the plurality of frequency shift units, and combines the outputs at the original frequency position by an addition unit; and converts an output from the addition unit to time domain by an inverse Fourier transform unit.

The spectrum combination filter bank in the wireless transmission method according to the seventh invention converts the received signals to frequency domain by a Fourier transform unit; shifts an output from the Fourier transform unit from the predetermined frequency position to an original frequency position where each of the sub-spectrum signals is at before arranged to the predetermined frequency position by each of a plurality of frequency shift units; divides each output from the plurality of frequency shift units and extracts the plurality of sub-spectrum signals by a plurality of spectrum extraction units; performs an addition of outputs from the plurality of spectrum extraction units, and combines the outputs at the original frequency position by an addition unit; and converts an output from the addition unit to time domain by an inverse Fourier transform unit.

According to an eighth invention, the transmitter and the receiver in the wireless transmission system of the seventh invention transmit a plurality of sub-spectrum signals through respective wireless transmission paths.

The spectrum division filter bank in the wireless transmission method according to the eighth invention converts the modulated signal to frequency domain by a Fourier transform unit; divides an output from the Fourier transform unit and outputs the plurality of sub-spectrum signals by a plurality of spectrum division units; shifts each of the plurality of sub-spectrum signals to the predetermined frequency position, and outputs each of the plurality of sub-spectrum signals arranged at the predetermined frequency position by a plurality of frequency shift units; and converts each output from the plurality of frequency shift units to time domain by a plurality of inverse Fourier transform units.

The spectrum division filter bank in the wireless transmission method according to the eighth invention converts the modulated signal to frequency domain by a Fourier transform unit; shifts an output from the Fourier transform unit to the predetermined frequency position by each of a plurality of frequency shift units; divides each output from the plurality of frequency shift units and outputs each of the plurality of sub-spectrum signals arranged at the predetermined frequency position by a plurality of spectrum division units; and converts each output from the plurality of spectrum division units to time domain by a plurality of inverse Fourier transform units.

The spectrum combination filter bank in the wireless transmission method according to the eighth invention converts each of received signals transmitted through the plurality of wireless transmission paths to frequency domain by a plurality of Fourier transform units; divides an output from the Fourier transform unit and extracts the plurality of sub-spectrum signals by a plurality of spectrum extraction units; shifts each of the plurality of sub-spectrum signals output from the plurality of spectrum extraction units to an original frequency position where each of the sub-spectrum signals is at before arranged to the predetermined frequency position by a plurality of frequency shift units; performs an addition of outputs from the plurality of frequency shift units, and combines the outputs at the original frequency position by an addition unit; and converts an output from the addition unit to time domain by an inverse Fourier transform unit.

The spectrum combination filter bank in the wireless transmission method according to the eighth invention converts each of received signals transmitted through the plurality of wireless transmission paths to frequency domain by a plurality of Fourier transform units; shifts each output from the plurality of Fourier transform units from a predetermined frequency position to an original frequency position where each of the sub-spectrum signals is at before arranged to the predetermined frequency position by a plurality of frequency shift units; divides each output from the plurality of frequency shift units and extracts the plurality of sub-spectrum signals by a plurality of spectrum extraction units; performs an addition of outputs from the plurality of spectrum extraction units, and combines the outputs at the original frequency position by an addition unit; and converts an output from the addition unit to time domain by an inverse Fourier transform unit.

According to the present invention, since one modulated signal is divided to generate a plurality of sub-spectrum signals which are in turn subjected to direct spectrum division transmission with the plurality of sub-spectrum signals arranged in spectra, a direct spectrum division transmission effectively using an unused frequency band of a transmission path occupied by another user can be achieved. In addition, since a plurality of sub-spectrum signals can be handled by one modulation circuit and one demodulation circuit, a modulation circuit or a demodulation circuit for each sub-spectrum signal is not required, enabling direct spectrum division transmission with a reduced circuit size for the wireless transmission system.

Further, since one modulated signal is divided into spectra, allowing the peak average power ratio (PAPR) to be smaller compared to conventional multicarrier transmission, the size of the amplifier in the RF circuits of the transmitter and the receiver can be reduced.

BRIEF DESCRIPTION OF THE DRAWINGS

FIG. 20 are diagrams showing another exemplary spectrum division.

FIG. 27 are block diagrams showing an exemplary configuration of a conventional OFDM transmission system.

DETAILED DESCRIPTION OF THE EMBODIMENTS

Figure 1:
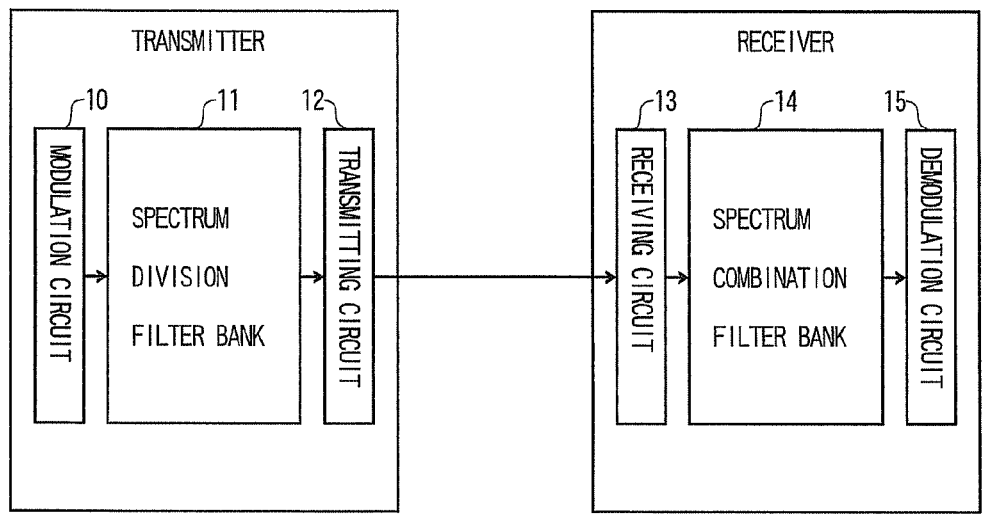
FIG. 1 is a block diagram showing a first embodiment of a wireless transmission system according to the present invention.

FIG. 1 shows a first embodiment of a wireless transmission system according to the present invention.

In FIG. 1, the wireless transmission system according to the present embodiment has a configuration in which a transmitter and a receiver are coupled with each other through a wireless transmission path. The transmitter includes a modulation circuit 10, a spectrum division filter bank 11 and a transmitting circuit 12, and transmits a plurality of sub-spectrum signals which result from the spectrum division of a modulated signal, and each of which is arranged at a predetermined frequency position. The receiver includes a receiving circuit 13, a spectrum combination filter bank 14 and a demodulation circuit 15, and extracts a plurality of sub-spectrum signals from received signals subjected to direct spectrum division transmission, and combines the sub-spectrum signals into an original modulated signal for demodulation.

Figure 2:
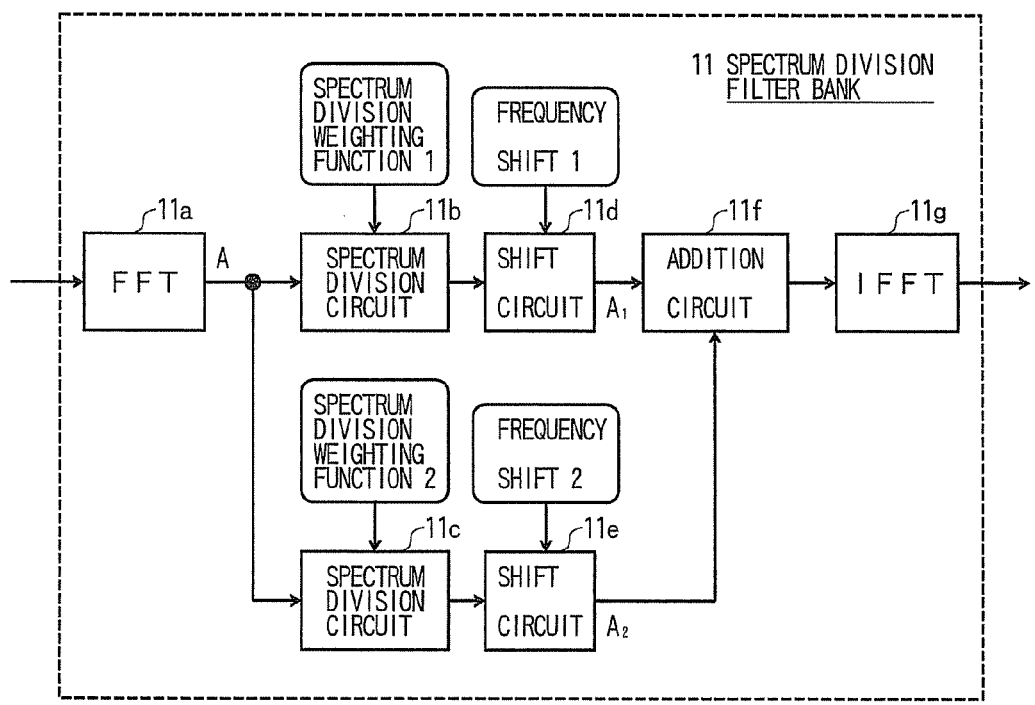
FIG. 2 is a block diagram showing a first exemplary configuration of a spectrum division filter bank 11.

FIG. 2 shows a first exemplary configuration of a spectrum division filter bank 11. Here, an exemplary configuration is shown, in which spectrum division is performed to generate two sub-spectrum signals.

In FIG. 2, the spectrum division filter bank 11 includes: an FFT circuit 11a that converts an input modulated signal to frequency domain; a spectrum division circuit 11b that outputs a sub-spectrum signal resulting from spectrum division by multiplying the output from the FFT circuit 11a by a spectrum division weighting function 1; a spectrum division circuit 11c that outputs a sub-spectrum signal resulting from spectrum division by multiplying the output from the FFT circuit 11a by a spectrum division weighting function 2; a frequency shift circuit 11d that shifts the sub-spectrum signal output from the spectrum division circuit 11b by a frequency shift 1; a frequency shift circuit 11e that shifts the sub-spectrum signal output from the spectrum division circuit 11c by a frequency shift 2; an addition circuit 11f that performs an addition of the outputs from the frequency shift circuits 11d and 11e; and an IFFT circuit 11g that converts the output from the addition circuit 11f to time domain.

Figure 3:
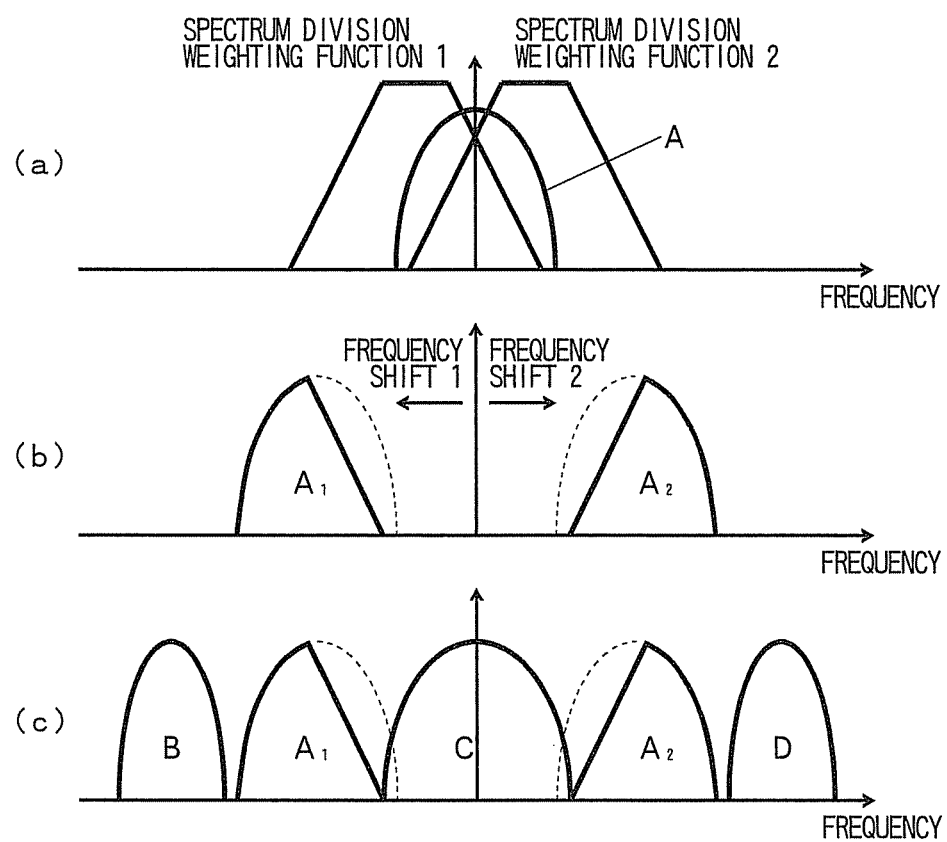
FIG. 3 are diagrams showing a flow of the signal processing of the spectrum division filter bank 11 of the first exemplary configuration.

FIG. 3 show a flow of the signal processing of the spectrum division filter bank 11 of the first exemplary configuration.

In FIGS. 3(a) and (b), a modulated signal input into the spectrum division filter bank 11 is subjected to a fast Fourier transform processing by the FFT circuit 11a, and converted from time domain to frequency domain to obtain a modulated signal A. The spectrum division circuit 11b multiplies the modulated signal A output from the FFT circuit 11a by a spectrum division weighting function 1, and outputs a sub-spectrum signal resulting from the spectrum division in the frequency domain of the modulated signal A. The spectrum division circuit 11c multiplies the modulated signal A output from the FFT circuit 11a by a spectrum division weighting function 2 to output a sub-spectrum signal resulting from the spectrum division in the frequency domain of the modulated signal A. The frequency shift circuit 11d shifts the sub-spectrum signal output from the spectrum division circuit 11b by a frequency shift 1 to generate a sub-spectrum signal $A_1$ equivalently frequency-converted. The frequency shift circuit 11e shifts the sub-spectrum signal output from the spectrum division circuit 11c by a frequency shift 2 to generate a sub-spectrum signal $A_2$ equivalently frequency-converted.

The addition circuit 11f performs an addition of the outputs from the frequency shift circuits 14d and 14e in the frequency domain, arranges each of the sub-spectrum signals $A_1$ and $A_2$ resulting from spectrum division and frequency conversion at a predetermined frequency position, and outputs the signals to the IFFT circuit 11g. The IFFT circuit 11g performs an inverse fast Fourier conversion processing to convert the modulated signal from frequency domain to time domain.

The modulated signal is converted to a radio signal and transmitted from the transmitting circuit 12 shown in FIG. 1. At that time, as shown in FIG. 3(c), when modulated signals B, C and D for other users occupy respective frequency bands on a wireless transmission path, the sub-spectrum signals $A_1$ and $A_2$ are inserted into unused frequency bands. The frequency bands and frequency positions of these sub-spectrum signals $A_1$ and $A_2$ are set by spectrum division weighting functions 1 and 2 and frequency shifts 1 and 2 depending on respective unused frequency bands.

Figure 4:
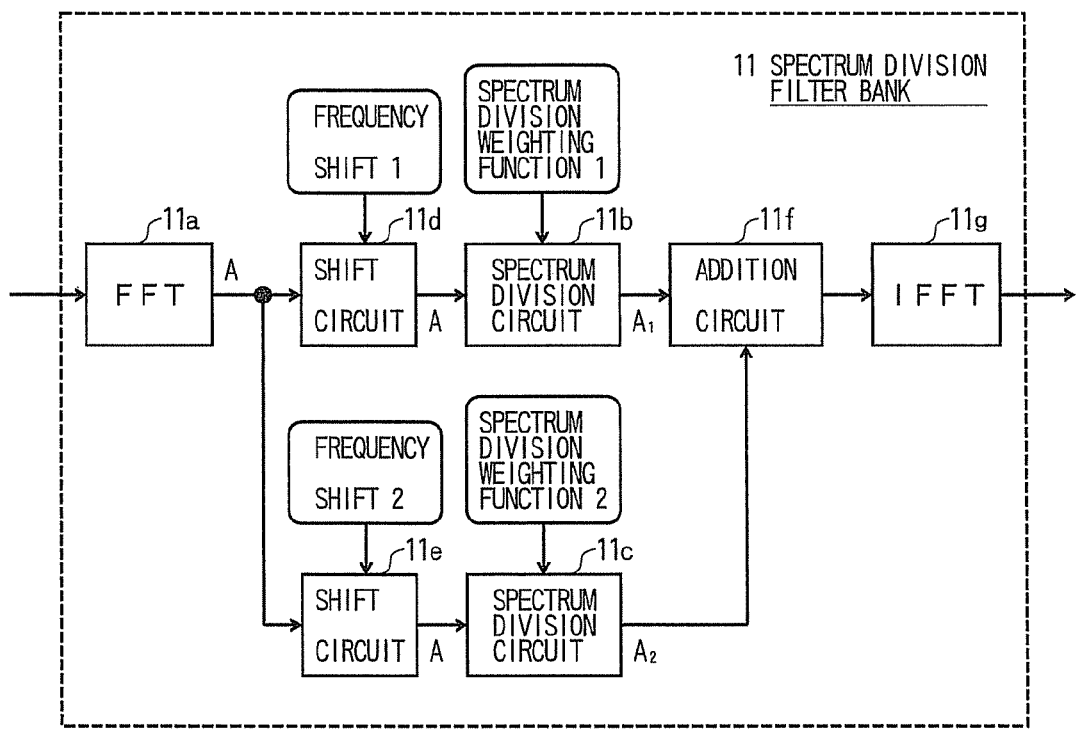
FIG. 4 is a block diagram showing a second exemplary configuration of the spectrum division filter bank 11.

FIG. 4 shows a second exemplary configuration of a spectrum division filter bank 11. Here, an exemplary configuration is shown, in which spectrum division is performed to generate two sub-spectrum signals.

In FIG. 4, the spectrum division filter bank 11 includes: an FFT circuit 11a that converts an input modulated signal to frequency domain; a frequency shift circuit 11d that shifts the output from the FFT circuit 11a by a frequency shift 1; a frequency shift circuit 11e that shifts the output from the FFT circuit 11a by a frequency shift 2; a spectrum division circuit 11b that outputs a sub-spectrum signal resulting from spectrum division by multiplying the output from the frequency shift circuit 11d by a spectrum division weighting function 1; a spectrum division circuit 11c that outputs a sub-spectrum signal resulting from spectrum division by multiplying the output from the frequency shift circuit 11e by a spectrum division weighting function 2; an addition circuit 11f that performs an addition of the outputs from the frequency shift circuits 11b and 11c; and an IFFT circuit 11g that converts the output from the addition circuit 11f to time domain.

Figure 5:
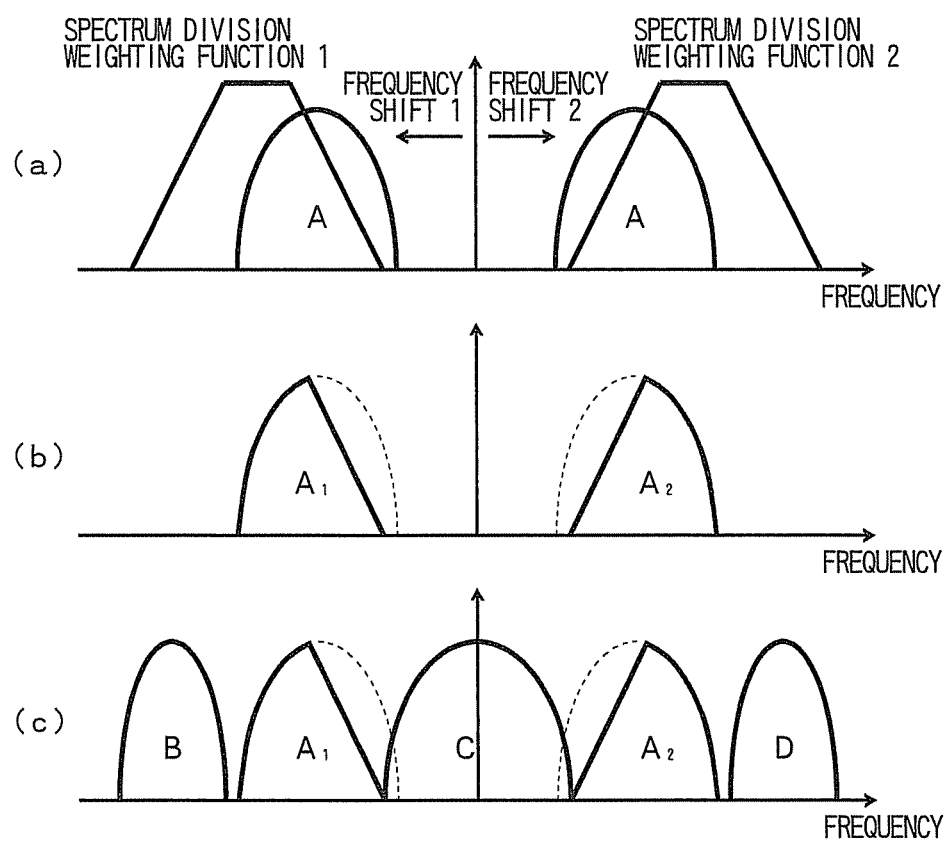
FIG. 5 are diagrams showing a flow of the signal processing of the spectrum division filter bank 11 of the second exemplary configuration.

FIG. 5 show a flow of the signal processing of the spectrum division filter bank 11 of the second exemplary configuration.

In FIGS. 5(a) and (b), a modulated signal input into the spectrum division filter bank 11 is subjected to a fast Fourier transform processing by the FFT circuit 11a, and converted from time domain to frequency domain to obtain a modulated signal A. The frequency shift circuit 11d shifts the modulated signal A output from the FFT circuit 11a by a frequency shift 1 so as to be equivalently frequency-converted. The frequency shift circuit 11e shifts the modulated signal A output from the FFT circuit 11a by a frequency shift 2 so as to be equivalently frequency-converted. The spectrum division circuit 11b multiplies output from the frequency shift circuit 11d by the spectrum division weighting function 1, and outputs a sub-spectrum signal $A_1$ resulting from spectrum division in the frequency domain of the modulated signal A. The spectrum division circuit 11c multiplies output from the frequency shift circuit 11e by the spectrum division weighting function 2, and outputs a sub-spectrum signal $A_2$ resulting from the spectrum division in the frequency domain of the modulated signal A.

The addition circuit 11f performs an addition of the outputs from the spectrum division circuits 14b and 14c in the frequency domain, arranges each of the sub-spectrum signals $A_1$ and $A_2$ resulting from frequency conversion and spectrum division at a predetermined frequency position, and outputs the signals to the IFFT circuit 11g. The IFFT circuit 11g performs an inverse fast Fourier conversion processing to convert the modulated signal from frequency domain to time domain.

The modulated signal is converted to a radio signal and transmitted from the transmitting circuit 12 shown in FIG. 1. At that time, as shown in FIG. 5(c), when modulated signals B, C and D for other users occupy respective frequency bands on a wireless transmission path, the sub-spectrum signals $A_1$ and $A_2$ are inserted into unused frequency bands. The frequency bands and frequency positions of these sub-spectrum signals $A_1$ and $A_2$ are set by spectrum division weighting functions 1 and 2 and frequency shifts 1 and 2 depending on respective unused frequency bands.

As described above, in the past, if sequential unused frequency bands could not be acquired, no frequency band could be assigned to the modulated signal A. In addition, dispersed unused frequency bands could not be used effectively. On the contrary, in the wireless communication system according to the present invention, the spectrum division filter bank 11 shown in FIG. 2 or FIG. 4 is used to perform spectrum division and arrangement of the modulated signal A over the dispersed unused frequency bands, so that direct spectrum division transmission of the modulated signal A becomes possible even if sequential unused frequency band is not acquired, allowing frequency utilization efficiency to be improved as the whole system.

Figure 6:
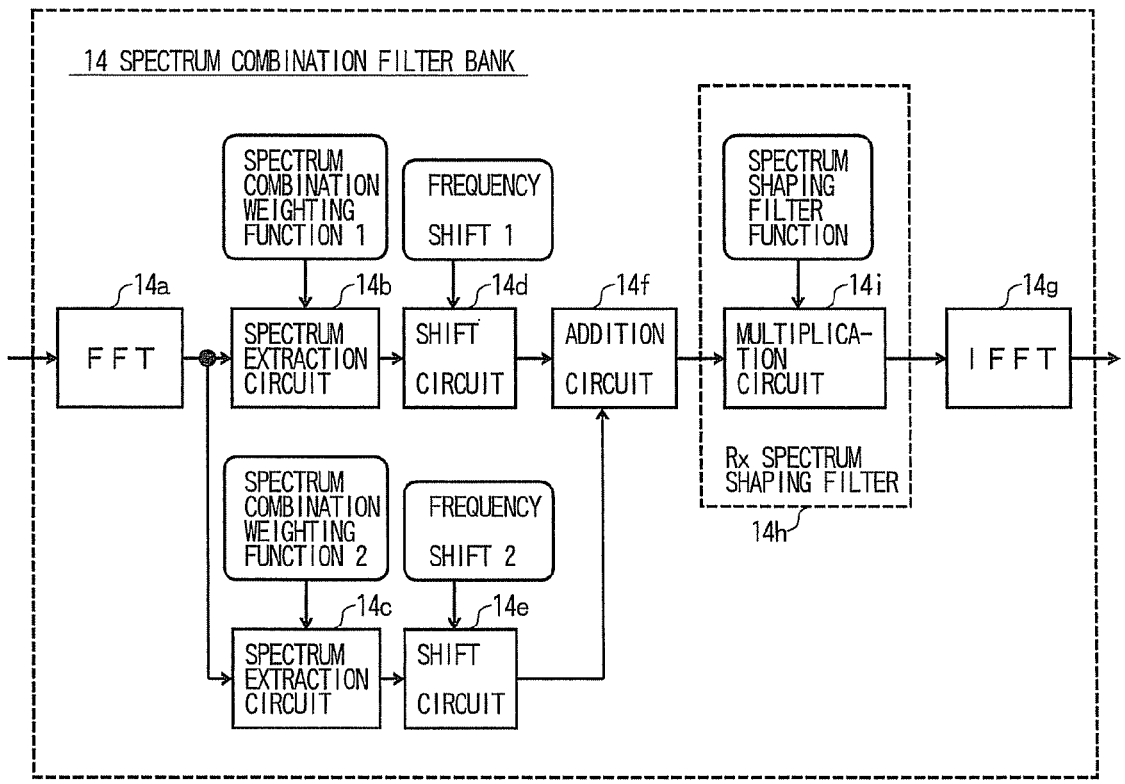
FIG. 6 is a block diagram showing the first exemplary configuration of a spectrum combination filter bank 14.

FIG. 6 shows a first exemplary configuration of the spectrum combination filter bank 14. Here, an exemplary configuration is shown, in which spectrum combination of two sub-spectrum signals is performed.

In FIG. 6, the spectrum combination filter bank 14 includes: an FFT circuit 14a that converts an input modulated signal to frequency domain; a spectrum extraction circuit 14b that extracts a sub-spectrum signal by multiplying the output from the FFT circuit 14a by a spectrum combination weighting function 1; a spectrum extraction circuit 14c that extracts a sub-spectrum signal by multiplying the output from the FFT circuit 14a by a spectrum combination weighting function 2; a frequency shift circuit 14d that shifts the sub-spectrum signal output from the spectrum extraction circuit 14b by a frequency shift 1; a frequency shift circuit 14e that shifts the sub-spectrum signal output from the spectrum extraction circuit 14c by a frequency shift 2; an addition circuit 14f that performs an addition of the outputs from the frequency shift circuits 14d and 14e; and an IFFT circuit 14g that converts the output from the addition circuit 14f to time domain.

Note that, if needed, an Rx spectrum shaping filter 14h is inserted between the addition circuit 14f and the IFFT circuit 14g. The Rx spectrum shaping filter 14h includes a multiplication circuit 14i that multiplies the output from the addition circuit 14f by a spectrum shaping filter function in the frequency domain so as to remove noise and signal components out of a predetermined band.

Figure 7:
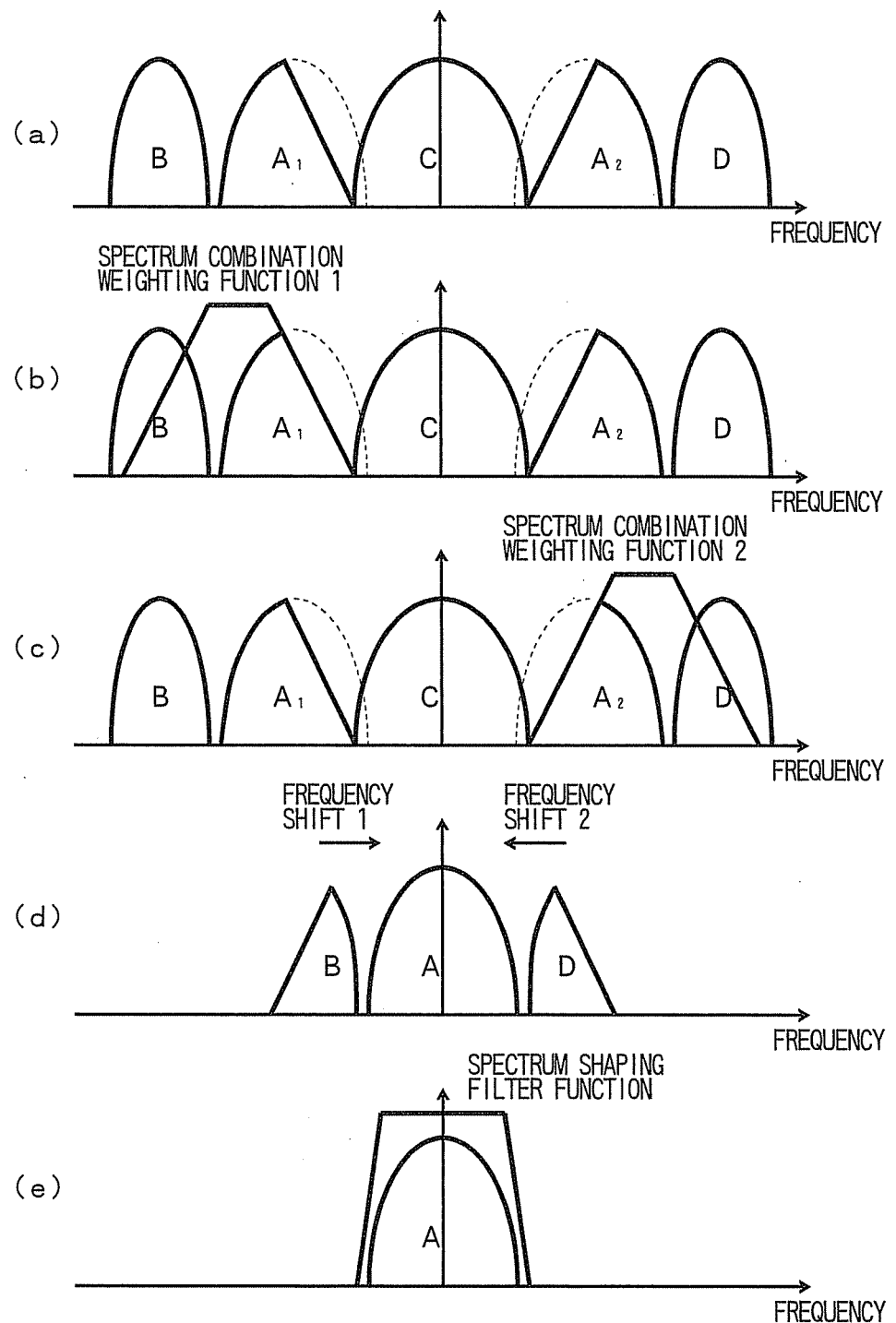
FIG. 7 are diagrams showing a flow of the signal processing of the spectrum combination filter bank 14 of the first exemplary configuration.

FIG. 7 show a flow of the signal processing of the spectrum combination filter bank 14 of the first exemplary configuration.

In FIG. 7(a), a received signal input into the spectrum combination filter bank 14 is subjected to a fast Fourier transform processing by the FFT circuit 14a, and converted from time domain to frequency domain. The sub-spectrum signals $A_1$ and $A_2$ are arranged at predetermined frequency positions on the received signal.

In FIGS. 7(b) and (c), the spectrum extraction circuit 14b multiplies the received signal output from the FFT circuit 14a by the spectrum combination weighting function 1, and extracts a sub-spectrum signal $A_1$ from the received signal in the frequency domain. The spectrum extraction circuit 14c multiplies the received signal output from the FFT circuit 14a by the spectrum combination weighting function 2, and extracts a sub-spectrum signal $A_2$ from the received signal in the frequency domain. That is, the spectrum extraction circuits 14b and 14c perform equivalent filter processing in the frequency domain by multiplying the received signal and the spectrum combination weighting functions 1 and 2 to remove noise and signal components out of the pass band of the spectrum combination weighting functions 1 and 2, and extract the sub-spectrum signals $A_1$ and $A_2$.

In FIG. 7(d), the frequency shift circuit 14d shifts the output from the spectrum extraction circuit 14b by a frequency shift 1 so as to be equivalently frequency-converted. The frequency shift circuit 14e shifts the output from the spectrum extraction circuit 14c by a frequency shift 2 so as to be equivalently frequency-converted. The addition circuit 14f performs an addition of the signals each of which is frequency-converted to combine the sub-spectrum signals $A_1$ and $A_2$ at a frequency position where the sub-spectrum signals $A_1$ and $A_2$ are at before being arranged to the predetermined frequency positions and restore the original modulated signal A.

In FIG. 7(e), the Rx spectrum shaping filter 14h removes modulated signals B and D in neighboring bands contained in the output from the addition circuit 14f, selects restored modulated signal A and outputs it to the IFFT circuit 14g. The IFFT circuit 14g performs inverse fast Fourier conversion processing to convert the modulated signal from frequency domain to time domain, and outputs the modulated signal to the subsequent demodulation circuit.

Note that, the spectrum combination weighting functions 1 and 2 of the spectrum combination filter bank 14 of the first exemplary configuration shown in FIGS. 6 and 7 are set to values corresponding to the spectrum division weighting functions 1 and 2 of the spectrum division filter bank 11 of the second exemplary configuration shown in FIGS. 4 and 5 and the transfer function between the transmitter and the receiver. In addition, the frequency shifts 1 and 2 of the spectrum combination filter bank 14 of the first exemplary configuration shown in FIGS. 6 and 7 are set to values complementary to the frequency shifts 1 and 2 of the spectrum division filter bank 11 of the second exemplary configuration shown in FIGS. 4 and 5.

Figure 8:
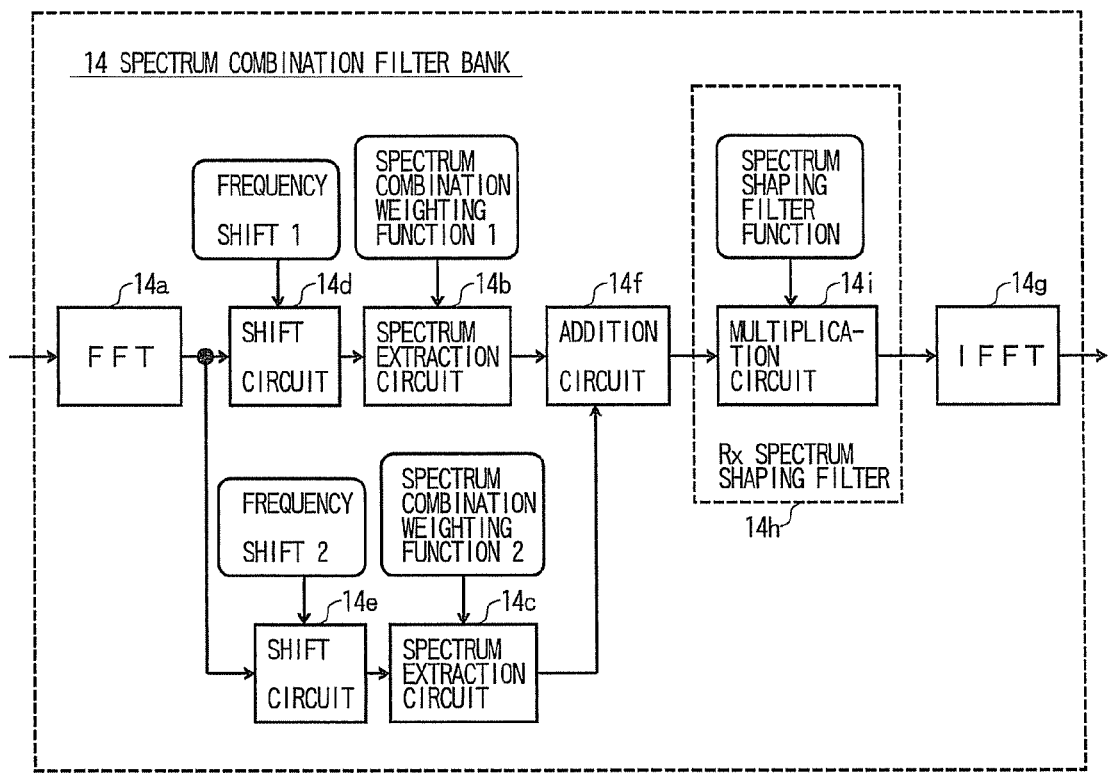
FIG. 8 is a block diagram showing the second exemplary configuration of the spectrum combination filter bank 14.

FIG. 8 shows the second exemplary configuration of the spectrum combination filter bank 14. Here, an exemplary configuration is shown, in which spectrum combination of two sub-spectrum signals is performed.

In FIG. 8, the spectrum combination filter bank 14 includes: an FFT circuit 14a that converts an input modulated signal to frequency domain; a frequency shift circuit 14d that shifts the output from the FFT circuit 14a by a frequency shift 1; a frequency shift circuit 14e that shifts the output from the FFT circuit 14a by a frequency shift 2; a spectrum extraction circuit 14b that extracts a sub-spectrum signal by multiplying the output from the frequency shift circuit 14d by a spectrum combination weighting function 1; a spectrum extraction circuit 14c that extracts a sub-spectrum signal by multiplying the output from the frequency shift circuit 14e by a spectrum combination weighting function 2; an addition circuit 14f that performs an addition of the outputs from the spectrum extraction circuits 14b and 14c; and an IFFT circuit 14g that converts the output from the addition circuit 14f to time domain.

Note that, if needed, the Rx spectrum shaping filter 14h is inserted between the addition circuit 14f and the IFFT circuit 14g. The Rx spectrum shaping filter 14h includes a multiplication circuit 14*i* that multiplies the output from the addition circuit 14*f* by a spectrum shaping filter function in the frequency domain so as to remove noise and signal components out of a predetermined band.

Figure 9:
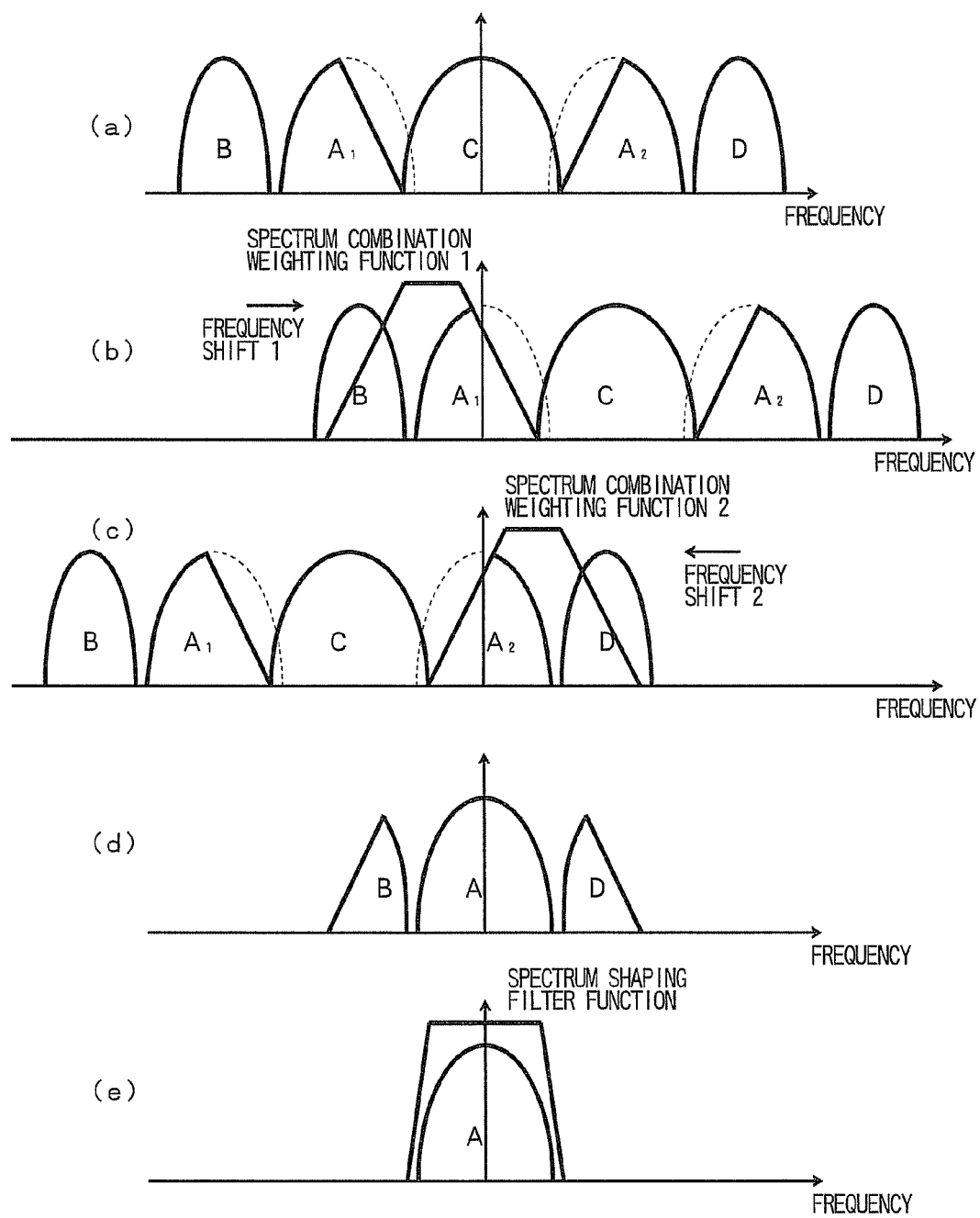
FIG. 9 are diagrams showing a flow of the signal processing of the spectrum combination filter bank 14 of the second exemplary configuration.

FIG. 9 show a flow of the signal processing of the spectrum combination filter bank 14 of the second exemplary configuration.

In FIG. 9(*a*), a received signal input into the spectrum combination filter bank 14 is subjected to a fast Fourier transform processing by the FFT circuit 14*a*, and converted from time domain to frequency domain. The sub-spectrum signals $A_1$ and $A_2$ are arranged at predetermined frequency positions on the received signal.

In FIGS. 9(*b*) and (*c*), the frequency shift circuit 14*d* shifts the output from the FFT circuit 14*a* by a frequency shift 1 so as to be equivalently frequency-converted. The spectrum extraction circuit 14*b* multiplies the received signal output from the frequency shift circuit 14*d* by the spectrum combination weighting function 1, and extracts a sub-spectrum signal $A_1$ from the received signal in the frequency domain. The frequency shift circuit 14*e* shifts the output from the FFT circuit 14*a* by a frequency shift 2 so as to be equivalently frequency-converted. The spectrum extraction circuit 14*c* multiplies the received signal output from the frequency shift circuit 14*e* by the spectrum combination weighting function 2, and extracts a sub-spectrum signal $A_2$ from the received signal in the frequency domain. That is, the spectrum extraction circuits 14*b* and 14*c* perform equivalent filter processing in the frequency domain by multiplying the frequency-converted received signal and the spectrum combination weighting functions 1 and 2 to remove noise and signal components out of the pass band of the spectrum combination weighting functions 1 and 2, and extract the sub-spectrum signals $A_1$ and $A_2$.

In FIG. 9(*d*), the addition circuit 14*f* performs an addition of the sub-spectrum signals $A_1$ and $A_2$ extracted from the received signal to combine the sub-spectrum signals $A_1$ and $A_2$ at a frequency position where the sub-spectrum signals $A_1$ and $A_2$ are at before being arranged to the predetermined frequency positions and restore the original modulated signal A.

In FIG. 9(*e*), the Rx spectrum shaping filter 14*h* removes modulated signals B and D in neighboring bands contained in the output from the addition circuit 14*f*, selects restored modulated signal A and outputs it to the IFFT circuit 14*g*. The IFFT circuit 14*g* performs inverse fast Fourier conversion processing to convert the modulated signal from frequency domain to time domain, and outputs the modulated signal to the subsequent demodulation circuit.

Note that, the spectrum combination weighting functions 1 and 2 of the spectrum combination filter bank 14 of the second exemplary configuration shown in FIGS. 8 and 9 are set to values corresponding to the spectrum division weighting functions 1 and 2 of the spectrum division filter bank 11 of the first exemplary configuration shown in FIGS. 2 and 3 and the transfer function between the transmitter and the receiver. In addition, the frequency shifts 1 and 2 of the spectrum combination filter bank 14 of the second exemplary configuration shown in FIGS. 8 and 9 are set to values complementary to the frequency shifts 1 and 2 of the spectrum division filter bank 11 of the first exemplary configuration shown in FIGS. 2 and 3.

In addition, the spectrum division filter bank 11 and the spectrum combination filter bank 14 may adopt a well-known overlap and add method in which in order to process sequential signals, an input signal is partitioned at fixed intervals, and processed at each interval, and processed signals are added and output. Further, the spectrum division filter bank 11 and the spectrum combination filter bank 14 may adopt a well-known overlap and storage method in which an input signal is partitioned at partially overlapping fixed intervals, processed at each interval and after some of the overlapping portions are dropped from the processed signals, addition is carried out.

Figure 10:
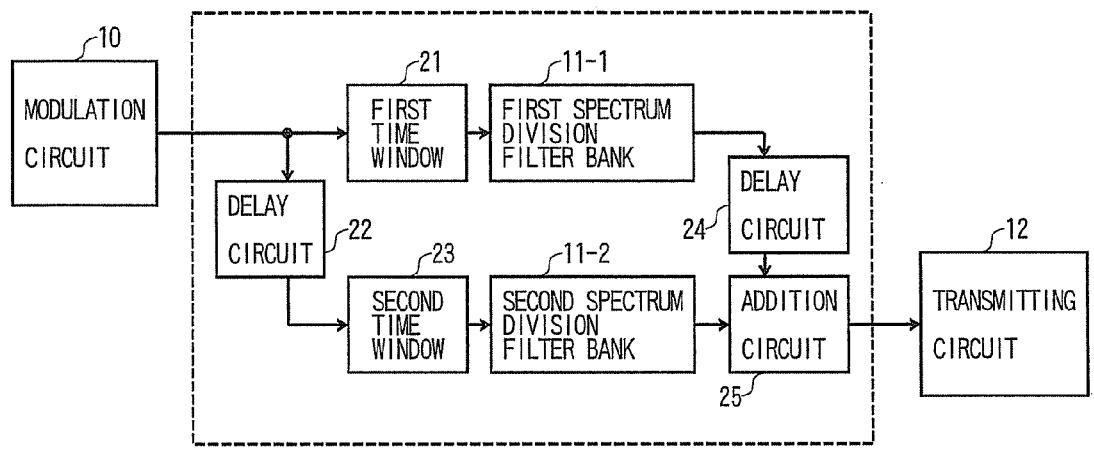
FIG. 10 is a block diagram showing an exemplary configuration of the spectrum division filter bank 11 to which an overlap and add method is applied.

FIG. 10 shows an exemplary configuration of the spectrum division filter bank 11 to which an overlap and add method is applied.

In FIG. 10, a modulated signal input from a modulation circuit 10 is branched into two lines, one of which is input into a first spectrum division filter bank 11-1 through a first time window 21, and the other is delayed by a delay circuit 22, and input into a second spectrum division filter bank 11-2 through a second time window 23. Note that, the first time window 21 and the second time window 23 are time windows having complementary characteristics in the time domain. The first spectrum division filter bank 11-1 and the second spectrum division filter bank 11-2 have the same circuit configuration as that of the spectrum division filter bank 11 shown in FIG. 2 or FIG. 4. The output from the first spectrum division filter bank 11-1 is delayed by a delay circuit 24, and then input into an addition circuit 25, added to the output from the second spectrum division filter bank 11-2 and output to the transmitting circuit 12. By applying such an overlap and add method, FFT processing at a limited interval can be continuously performed on sequential modulated signals in the time domain.

Figure 11:
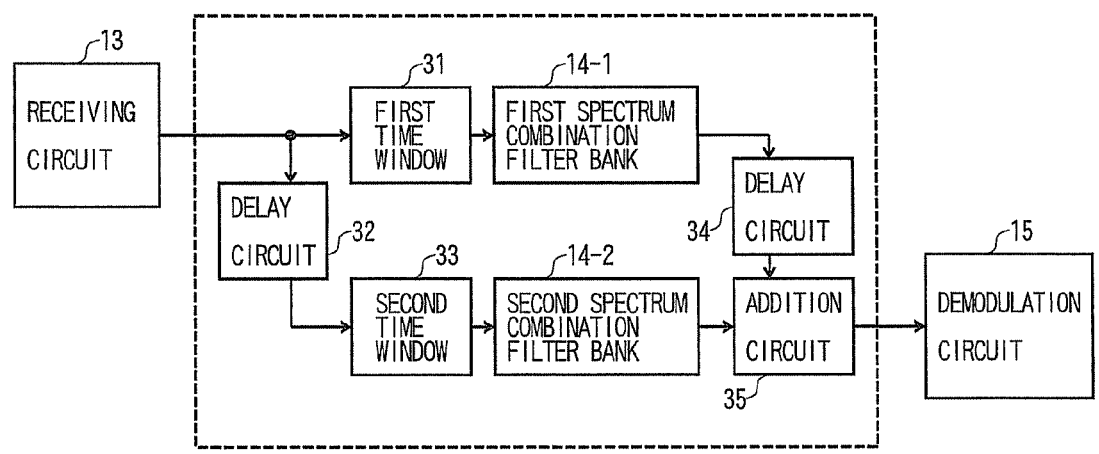
FIG. 11 is a block diagram showing an exemplary configuration of the spectrum combination filter bank 14 to which an overlap and add method is applied.

FIG. 11 shows an exemplary configuration of the spectrum combination filter bank 14 to which an overlap and add method is applied.

In FIG. 11, a received signal input from a receiving circuit 13 is branched into two lines, one of which is input into a first spectrum combination filter bank 14-1 through a first time window 31, and the other is delayed by a delay circuit 32, and input into a second spectrum combination filter bank 14-2 through a second time window 33. Note that, the first time window 31 and the second time window 33 are time windows having complementary characteristics in the time domain. The first spectrum combination filter bank 14-1 and the second spectrum combination filter bank 14-2 have the same circuit configuration as that of the spectrum combination filter bank 14 shown in FIG. 6 or FIG. 8. The output from the first spectrum combination filter bank 14-1 is delayed by a delay circuit 34, and then input into an addition circuit 35, added to the output from the second spectrum combination filter bank 14-2 and output to the demodulation circuit 15. By applying such an overlap and add method, FFT processing at a limited interval can be continuously performed on sequential received signals in the time domain.

Figure 12:
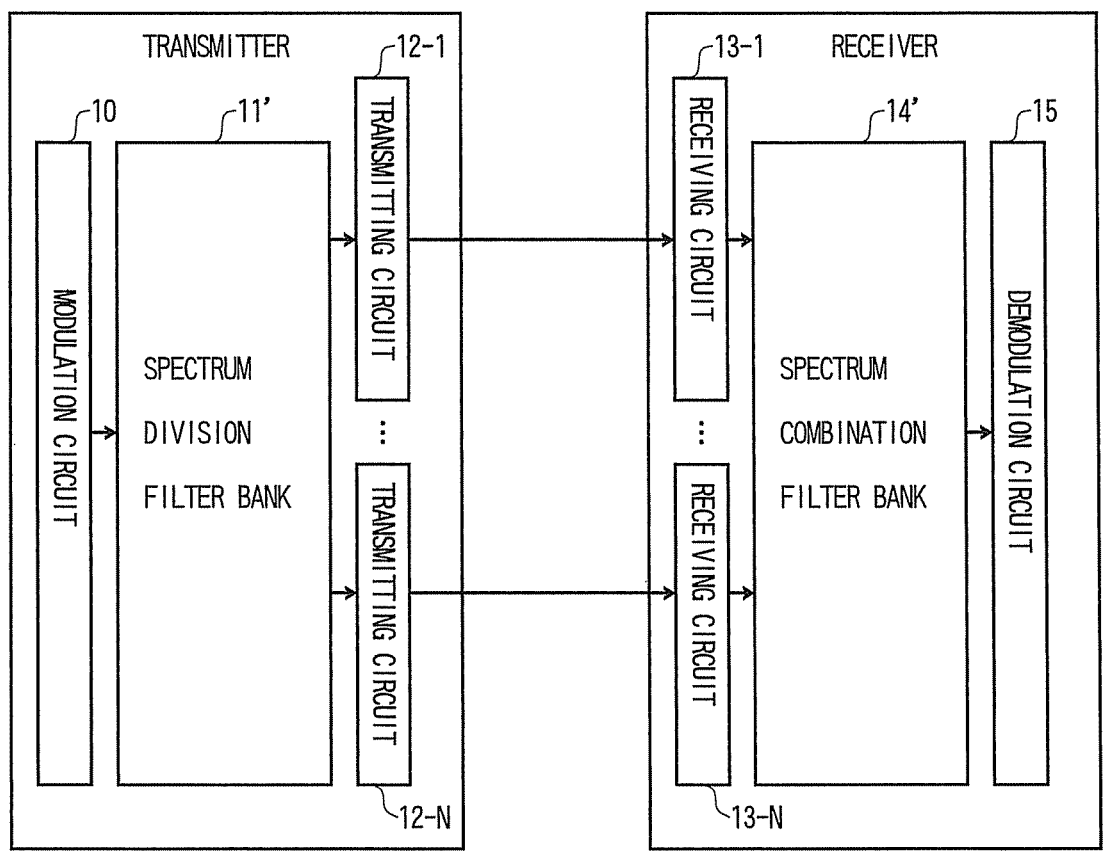
FIG. 12 is a block diagram showing a second embodiment of a wireless transmission system according to the present invention.

FIG. 12 shows a second embodiment of a wireless transmission system according to the present invention.

In FIG. 12, the wireless transmission system according to the present embodiment has a configuration in which transmitters and receivers are coupled through a plurality of wireless transmission paths. Here, a plurality of wireless transmission paths include a multiplex transmission path such as polarization division multiplexing and space division multiplexing.

The transmitter includes a modulation circuit 10, a spectrum division filter bank 11' and transmitting circuits 12-1, 12-2, . . . , 12-N corresponding to a plurality of wireless transmission paths, and transmits through respective corresponding transmitting circuits 12-1, 12-2, . . . , 12-N a plurality of sub-spectrum signals which result from the spectrum division of a modulated signal, and each of which is arranged at a predetermined frequency position. The receiver includes receiving circuits 13-1, 13-2, . . . , 13-N corresponding to a plurality of wireless transmission paths, a spectrum combination filter bank 14' and a demodulation circuit 15, receives received signals that are subjected to direct spectrum division transmission through the receiving circuits 13-1, 13-2, . . . , 13-N, extracts a plurality of sub-spectrum signals from respective received signals, and combines them into the original modulated signal for demodulation.

Figure 13:
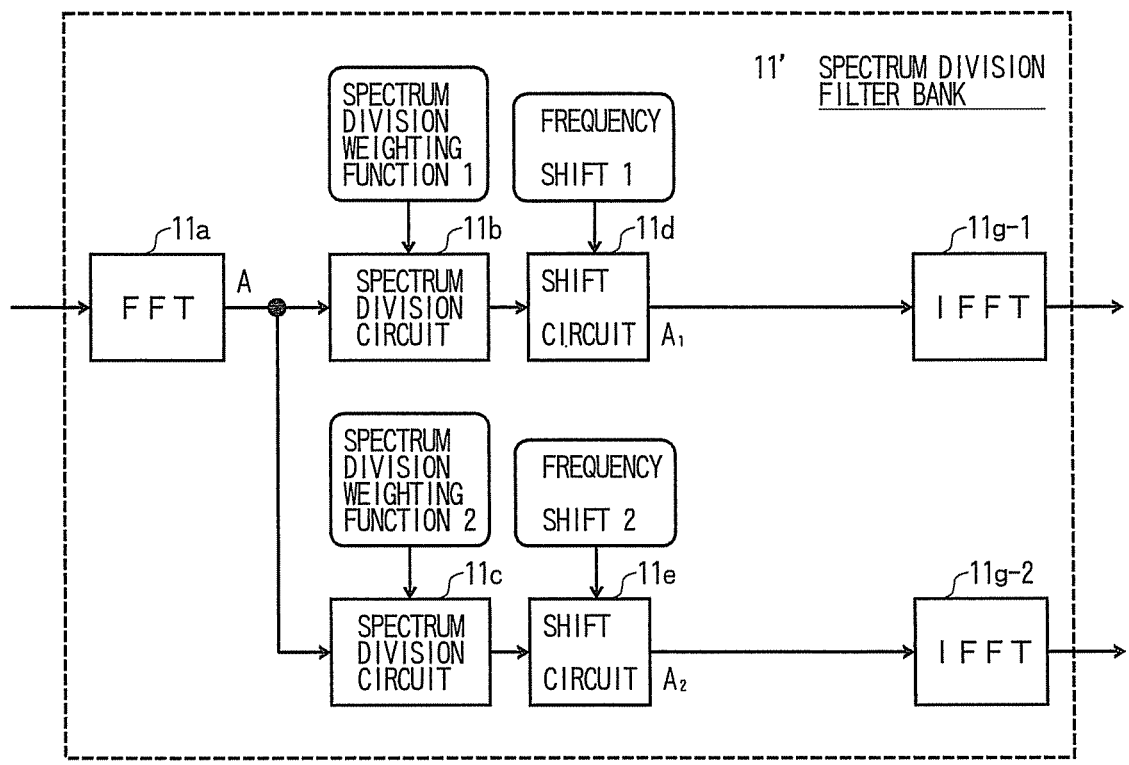
FIG. 13 is a block diagram showing a first exemplary configuration of a spectrum division filter bank 11'.

FIG. 13 shows a first exemplary configuration of a spectrum division filter bank 11'. Here, an exemplary configuration is shown, in which spectrum division is performed to generate two sub-spectrum signals.

In FIG. 13, the spectrum division filter bank 11 includes: an FFT circuit 11a that converts an input modulated signal to frequency domain; a spectrum division circuit 11b that outputs a sub-spectrum signal resulting from spectrum division by multiplying the output from the FFT circuit 11a by a spectrum division weighting function 1; a spectrum division circuit 11c that outputs a sub-spectrum signal resulting from spectrum division by multiplying the output from the FFT circuit 11a by a spectrum division weighting function 2; a frequency shift circuit 11d that shifts the sub-spectrum signal output from the spectrum division circuit 11b by a frequency shift 1; a frequency shift circuit 11e that shifts the sub-spectrum signal output from the spectrum division circuit 11c by a frequency shift 2; IFFT circuits 11g-1 and 11g-2 that convert each output from the frequency shift circuits 11d and 11e to time domain.

The difference from the first exemplary configuration of the spectrum division filter bank 11 shown in FIG. 2 is that the sub-spectrum signals $A_1$ and $A_2$ output from the frequency shift circuits 11d and 11e are output to the transmitting circuits 12-1 and 12-2 shown in FIG. 12 through the IFFT circuits 11g-1 and 11g-2, respectively. Accordingly, the sub-spectrum signals $A_1$ and $A_2$ are transmitted to the receiver through wireless transmission paths that are independent from each other.

Figure 14:
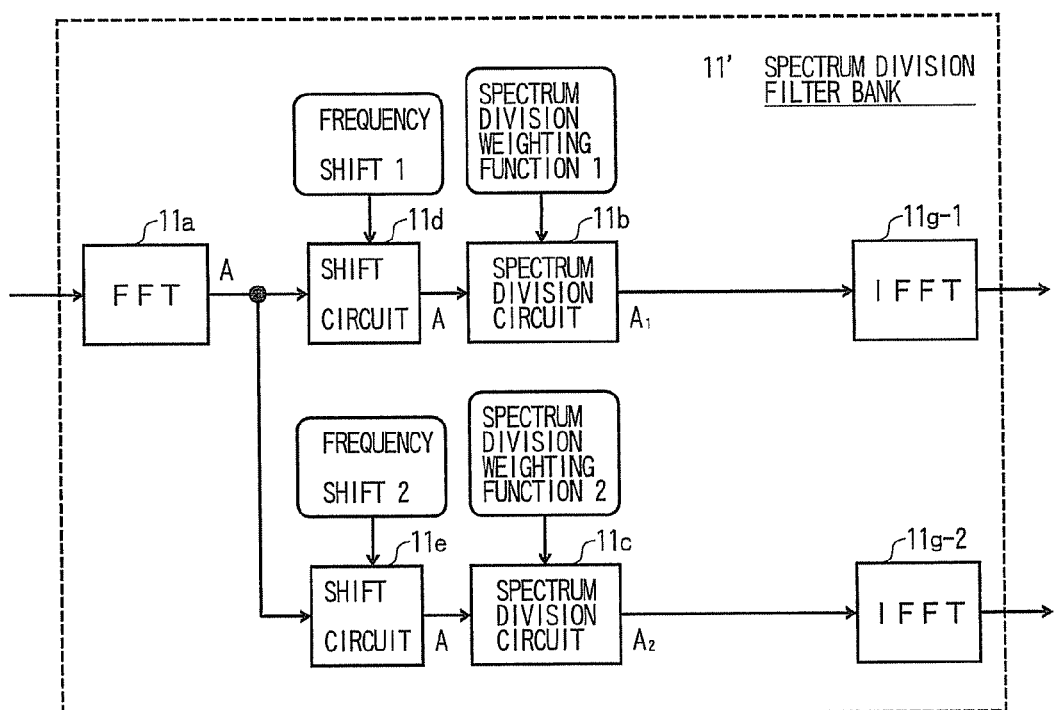
FIG. 14 is a block diagram showing a second exemplary configuration of the spectrum division filter bank 11'.

FIG. 14 shows a second exemplary configuration of the spectrum division filter bank 11'. Here, an exemplary configuration is shown, in which spectrum division is performed to generate two sub-spectrum signals.

In FIG. 14, the spectrum division filter bank 11' includes: an FFT circuit 11a that converts an input modulated signal to frequency domain; a frequency shift circuit 11d that shifts the output from the FFT circuit 11a by a frequency shift 1; a frequency shift circuit 11e that shifts the output from the FFT circuit 11a by a frequency shift 2; a spectrum division circuit 11b that outputs a sub-spectrum signal resulting from spectrum division by multiplying the output from the frequency shift circuit 11d by a spectrum division weighting function 1; a spectrum division circuit 11c that outputs a sub-spectrum signal resulting from spectrum division by multiplying the output from the frequency shift circuit 11e by a spectrum division weighting function 2; and IFFT circuits 11g-1 and 11g-2 that convert each output from the spectrum division circuits 11b and 11c to time domain.

The difference from the second exemplary configuration of the spectrum division filter bank 11 shown in FIG. 4 is that the sub-spectrum signals $A_1$ and $A_2$ output from the spectrum division circuits 11b and 11c are output to the transmitting circuits 12-1 and 12-2 shown in FIG. 12 through the IFFT circuits 11g-1 and 11g-2, respectively. Accordingly, the sub-spectrum signals $A_1$ and $A_2$ are transmitted to the receiver through wireless transmission paths that are independent from each other.

Figure 15:
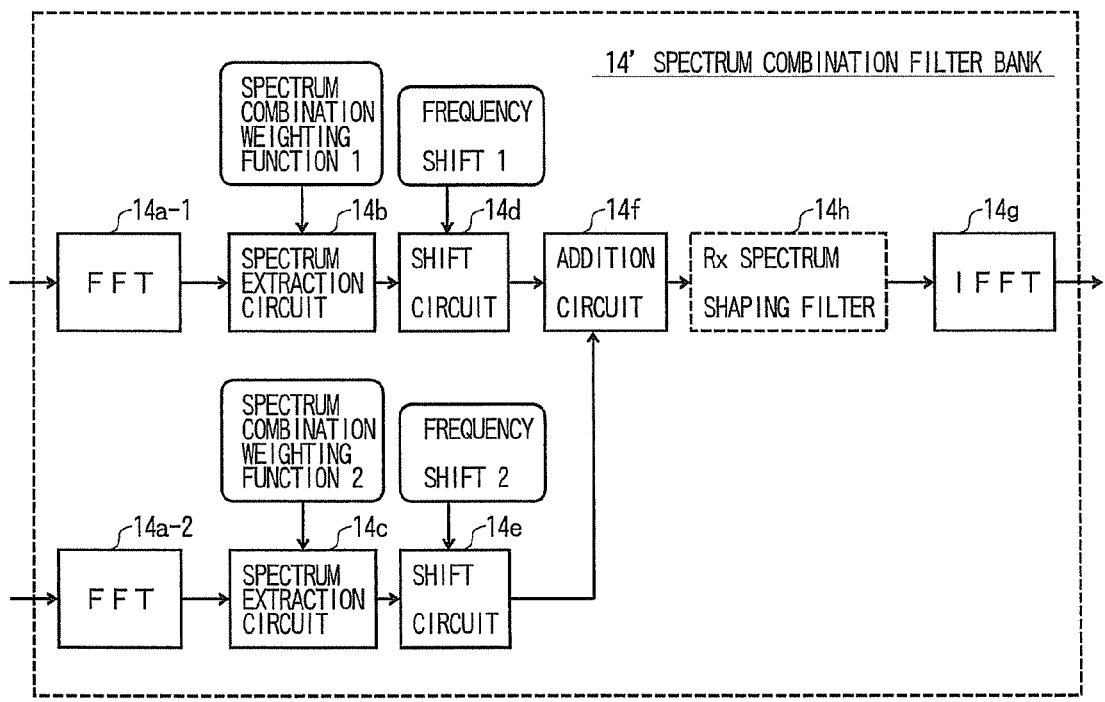
FIG. 15 is a block diagram showing the first exemplary configuration of a spectrum combination filter bank 14'.

FIG. 15 shows a first exemplary configuration of the spectrum combination filter bank 14'. Here, an exemplary configuration is shown, in which spectrum combination of two sub-spectrum signals is performed.

In FIG. 15, the spectrum combination filter bank 14' includes: FFT circuits 14a-1 and 14a-2 that convert a plurality of input modulated signals to frequency domain, respectively; a spectrum extraction circuit 14b that extracts a sub-spectrum signal by multiplying the output from the FFT circuit 14a-1 by a spectrum combination weighting function 1; a spectrum extraction circuit 14c that extracts a sub-spectrum signal by multiplying the output from the FFT circuit 14a-2 by a spectrum combination weighting function 2; a frequency shift circuit 14d that shifts the sub-spectrum signal output from the spectrum extraction circuit 14b by a frequency shift 1; a frequency shift circuit 14e that shifts the sub-spectrum signal output from the spectrum extraction circuit 14c by a frequency shift 2; an addition circuit 14f that performs an addition of the outputs from the frequency shift circuits 14d and 14e; and an IFFT circuit 14g that converts the output from the addition circuit 14f to time domain. Note that, the Rx spectrum shaping filter 14h is arranged as described above if needed.

The difference from the first exemplary configuration of the spectrum combination filter bank 14 shown in FIG. 6 is that a plurality of modulated signals input from the receiving circuits 13-1 and 13-2 shown in FIG. 12 are input to the corresponding spectrum extraction circuits 14b and 14c through the FFT circuits 14a-1 and 14a-2, respectively. Accordingly, respective sub-spectrum signals $A_1$ and $A_2$ are extracted from the received signals transmitted through the wireless transmission paths independently from each other and combined.

Figure 16:
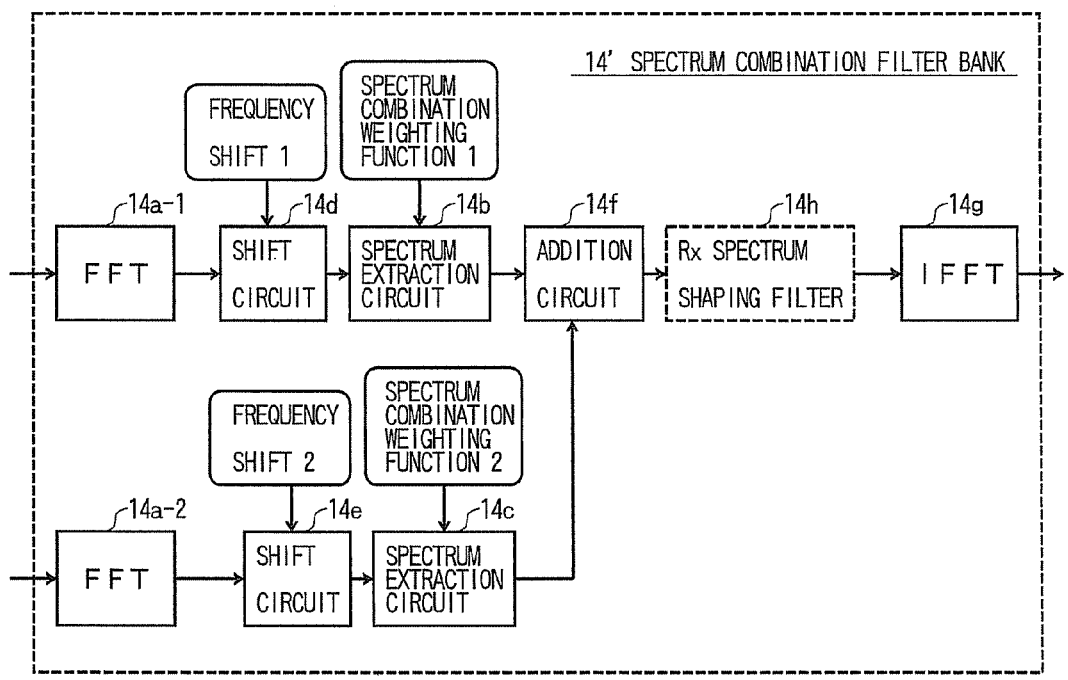
FIG. 16 is a block diagram showing the second exemplary configuration of the spectrum combination filter bank 14'.

FIG. 16 shows the second exemplary configuration of the spectrum combination filter bank 14'. Here, an exemplary configuration is shown, in which spectrum combination of two sub-spectrum signals is performed.

In FIG. 16, the spectrum combination filter bank 14' includes: FFT circuits 14a-1 and 14a-2 that convert input modulated signals to frequency domain, respectively; a frequency shift circuit 14d that shifts the output from the FFT circuit 14a by a frequency shift 1; a frequency shift circuit 14e that shifts the output from the FFT circuit 14a by a frequency shift 2; a spectrum extraction circuit 14b that extracts a sub-spectrum signal by multiplying the output from the frequency shift circuit 14d by a spectrum combination weighting function 1; a spectrum extraction circuit 14c that extracts a sub-spectrum signal by multiplying the output from the frequency shift circuit 14e by a spectrum combination weighting function 2; an addition circuit 14f that performs an addition of the outputs from the spectrum extraction circuits 14b and 14c; and an IFFT circuit 14g that converts the output from the addition circuit 14f to time domain. Note that, the Rx spectrum shaping filter 14h is arranged as described above if needed.

The difference from the second exemplary configuration of the spectrum combination filter bank 14 shown in FIG. 8 is that a plurality of modulated signals input from the receiving circuits 13-1 and 13-2 shown in FIG. 12 are input to the corresponding frequency shift circuits 14d and 14e through the FFT circuits 14a-1 and 14a-2, respectively. Accordingly, respective sub-spectrum signals $A_1$ and $A_2$ are extracted from the received signals transmitted through the wireless transmission paths independently from each other and combined.

Figure 17:
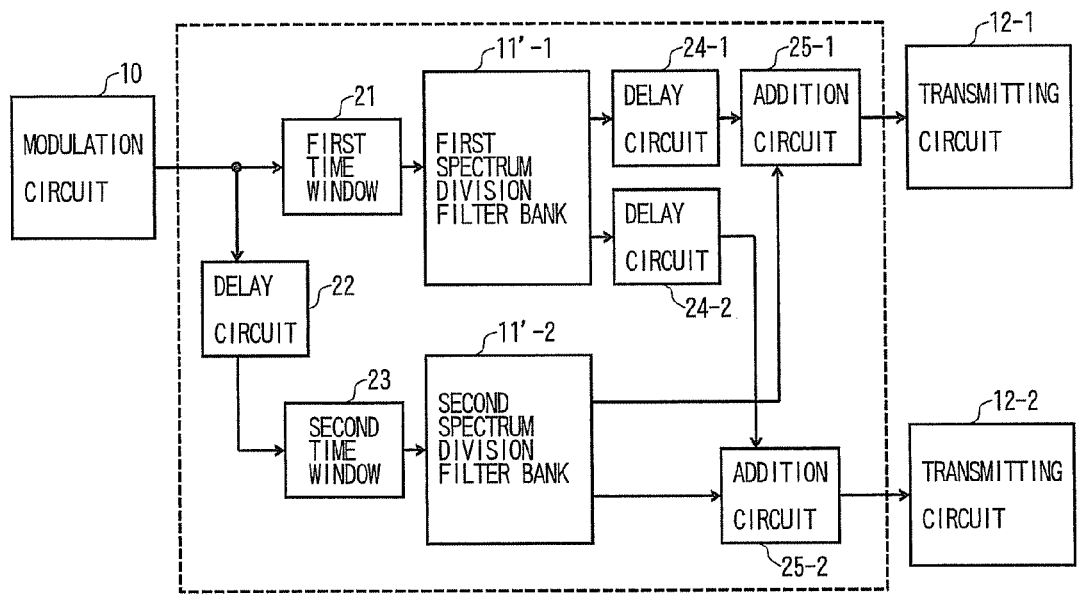
FIG. 17 is a block diagram showing an exemplary configuration of the spectrum division filter bank 11' to which an overlap and add method is applied.

FIG. 17 shows an exemplary configuration of the spectrum division filter bank 11' to which an overlap and add method is applied.

In FIG. 17, a modulated signal input from a modulation circuit 10 is branched into two lines, one of which is input into a first spectrum division filter bank 11'-1 through a first time window 21, and the other is delayed by a delay circuit 22, and input into a second spectrum division filter bank 11'-2 through a second time window 23. Note that, the first time window 21 and the second time window 23 are time windows having complementary characteristics in the time domain. The first spectrum division filter bank 11'-1 and the second spectrum division filter bank 11'-2 have the same circuit configuration as that of the spectrum division filter bank 11' shown in FIG. 13 or FIG. 14. The first output from the first spectrum division filter bank 11'-1 is delayed by a delay circuit 24-1, and then input into an addition circuit 25-1, added to the first output from the second spectrum division filter bank 11'-2 and output to the transmitting circuit 12-1. In addition, the second output from the first spectrum division filter bank 11'-1 is delayed by a delay circuit 24-2, and then input into an addition circuit 25-2, added to the second output from the second spectrum division filter bank 11'-2 and output to the transmitting circuit 12-2. By applying such an overlap and add method, FFT processing at a limited interval can be continuously performed on sequential modulated signals in the time domain.

Figure 18:
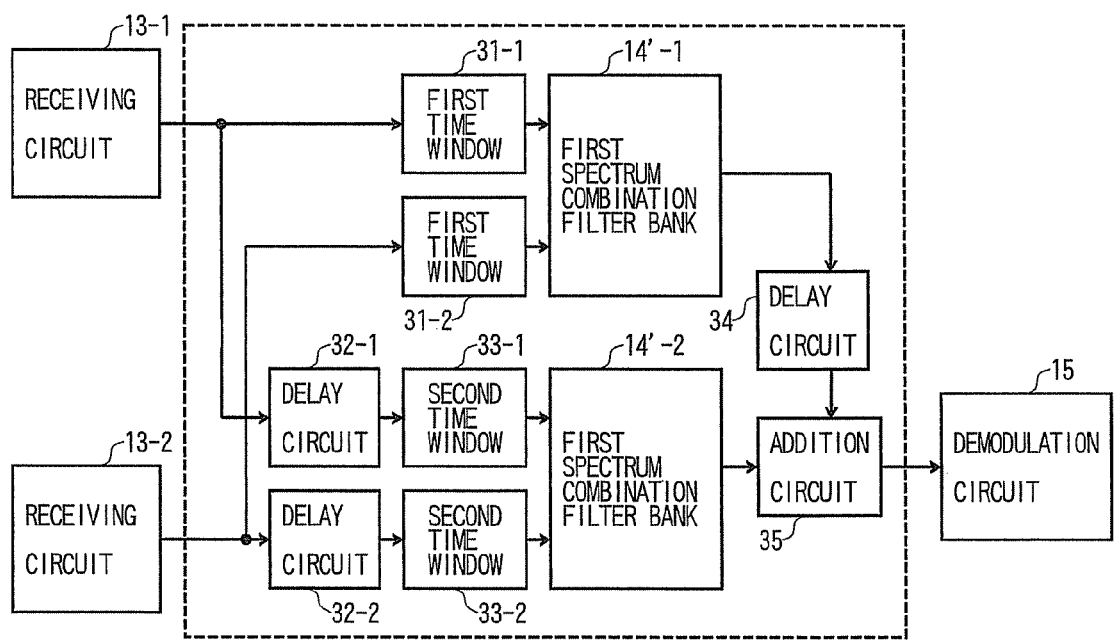
FIG. 18 is a block diagram showing an exemplary configuration of the spectrum combination filter bank 14' to which an overlap and add method is applied.

FIG. 18 shows an exemplary configuration of the spectrum combination filter bank 14' to which an overlap and add method is applied.

In FIG. 18, a received signal input from a receiving circuit 13-1 is branched into two lines, one of which is input into a first spectrum combination filter bank 14'-1 through a first time window 31-1, and the other is delayed by a delay circuit 32-1, and input into a second spectrum combination filter bank 14'-2 through a second time window 33-1. In addition, a received signal input from a receiving circuit 13-2 is branched into two lines, one of which is input into a first spectrum combination filter bank 14'-1 through a first time window 31-2, and the other is delayed by a delay circuit 32-2, and input into a second spectrum combination filter bank 14'-2 through a second time window 33-2. Note that, the first time window 31-1 and the second time window 33-1, and the first time window 31-2 and the second time window 33-2 are time windows having complementary characteristics in the time domain, respectively.

The first spectrum combination filter bank 14'-1 and the second spectrum combination filter bank 14'-2 have the same circuit configuration as that of the spectrum combination filter bank 14' shown in FIG. 15 or FIG. 16. The output from the first spectrum combination filter bank 14'-1 is delayed by the delay circuit 34, and then input into the addition circuit 35, added to the output from the second spectrum combination filter bank 14'-2 and output to the demodulation circuit 15. By applying such an overlap and add method, FFT processing at a limited interval can be continuously performed on sequential received signals in the time domain.

Each circuit of the spectrum division filter banks 11 and 11' and spectrum combination filter banks 14 and 14' described above is not limited to a hardware circuit, and for example may be made up of software processing.

In the wireless transmission system and the wireless transmission method of the present invention, it is important that the spectrum division filter bank 11 divides the modulated signal A to generate the sub-spectrum signals $A_1$ and $A_2$, which are in turn extracted by the spectrum combination filter bank 14, and combined to restore the modulated signal A. A spectrum division weighting function and a spectrum combination weighting function will now be described in detail.

Figure 19:
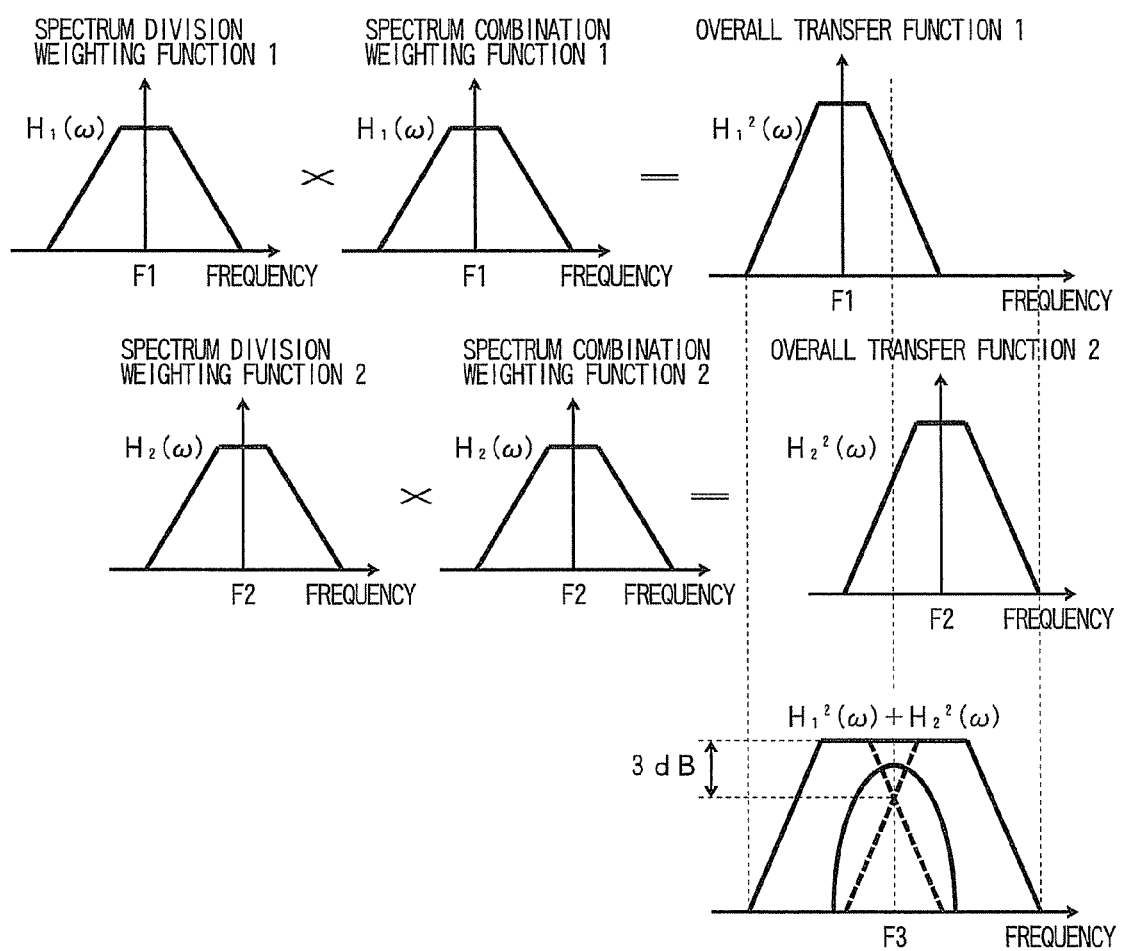
FIG. 19 is a diagram showing an example of a spectrum division weighting function and a spectrum combination weighting function.

FIG. 19 shows an example of a spectrum division weighting function and a spectrum combination weighting function.

When a modulated signal is filtered, convolution is performed in the time domain. Meanwhile, in the frequency domain where a Fourier transform is used, multiplication may be performed instead.

In the spectrum division filter bank 11, let a modulated signal to be input be $F(\omega)$, a spectrum division weighting function 1 be $H_1(\omega)$, a spectrum division weighting function 2 be $H_2(\omega)$, a frequency shift 1 be $\omega_1$ and a frequency shift 2 be $\omega_2$, a transmitted signal $Tx(\omega)$ obtained by adding sub-spectrum signals $A_1$ and $A_2$ in the frequency domain may be represented as follows:

$$Tx(\omega)=F(\omega-\omega_1)H_1(\omega-\omega_1)+F(\omega-\omega_2)H_2(\omega-\omega_2) \quad (1)$$

provided that $\omega_1$ and $\omega_2$ are selected so that, after addition, the signal bands of the sub-spectrum signals $A_1$ and $A_2$ do not overlap in the frequency domain.

Next, let a transfer function $G(\omega)$ between the transmitter and the receiver be 1, the received signal $Rx(\omega)$ to be input into the spectrum combination filter bank 14 may be represented as follows:

$$Rx(\omega)=G(\omega)Tx(\omega)=Tx(\omega) \quad (2)$$

Meanwhile, let the same $H_1(\omega)$ as the spectrum division weighting function 1 on the transmission side be the spectrum combination weighting function 1, the same $H_2(\omega)$ as the spectrum division weighting function 1 on the transmission side be the spectrum combination weighting function 2, a frequency shift 1 be $-\omega_1$ and a frequency shift 2 be $-\omega_2$, the output from the addition circuit 14f, $Rx_1(\omega)$ may be represented as follows:

$$Rx_1(\omega) = Rx(\omega + \omega_1)H_1(\omega) + Rx(\omega + \omega_2)H_2(\omega) \quad (3)$$
$$= F(\omega)(H_1^2(\omega) + H_2^2(\omega))$$

Let the frequency characteristics of the Rx spectrum shaping filter 14h be $\text{Roll}(\omega)$, the input signal of the demodulation circuit 15, $Rx_2(\omega)$ may be represented as follows:

$$Rx_2(\omega) = Rx_1(\omega)\text{Roll}(\omega) \quad (4)$$
$$= F(\omega)(H_1^2(\omega) + H_2^2(\omega))\text{Roll}(\omega)$$

Here, the spectrum combination weighting function $BC_k(\omega)$ is a function corresponding to the spectrum division weighting function $BD_k(\omega)$ and a transfer function $G(\omega)$ between the transmitter and the receiver where k represents a natural number from 1 to N, N represents the number of divided spectra and $\omega$ represents a frequency. An overall transfer function $BT_k(\omega)$ that is the product of the spectrum division weighting function $BD_k(\omega)$ and the spectrum combination weighting function $BC_k(\omega)$ in an occupied spectrum of the modulated signal is represented as follows:

$$\sum |BT_k(\omega)G(\omega + \omega_k)| = \sum |BD_k(\omega)BC_k(\omega)G(\omega + \omega_k)| \quad (5)$$
$$= A$$

where A represents a constant and $\omega_k$ represents a value determined by the frequency allocation of the sub-spectrum signal. The spectrum division weighting function $BD_k(\omega)$ and the spectrum combination weighting function $BC_k(\omega)$ making up a pair are both the same root roll-off function.

Here, let $G(\omega)=1$ as in Formula (2), Formula (5) may be represented as follows:

$$|BD_1(\omega)BC_1(\omega)| + |BD_2(\omega)BC_2(\omega)| = |H_1^2(\omega)| + |H_2^2(\omega)| \quad (6)$$
$$= A$$

Let $H_1(\omega) > 0$ and $H_2(\omega) > 0$, Formula (4) may be represented as follows:

$$Rx_2(\omega) = F(\omega)(H_1^2(\omega) + H_2^2(\omega))\text{Roll}(\omega) \quad (7)$$
$$= AF(\omega)\text{Roll}(\omega)$$

and the Rx spectrum shaping filter 14h performs filtering to extract a transmitted signal.

Meanwhile, when a delay time $\tau$ is assumed between the transmitter and the receiver, the transfer function $G(\omega)$ of an undistorted transmission path is represented as follows:

$$G(\omega) = \exp(-j(\omega\tau + \theta_0))$$

The received signal $RX(\omega)$ to be input into the receiver may be represented as follows:

$$Rx(\omega) = G(\omega)Tx(\omega) = \exp(-j(\omega\tau + \theta_0))Tx(\omega) \quad (8)$$

Here, let the spectrum combination weighting function 1 on the reception side be $H_1(\omega)$, and the spectrum combination weighting function 2 be $H_2(\omega)\exp(-j(\omega_1-\omega_2)\tau)$, the output $Rx_1(\omega)$ of the addition circuit 14f may be represented as follows:

$$Rx_1(\omega) = Rx(\omega + \omega_1)H_1(\omega) + \quad (9)$$
$$Rx(\omega + \omega_2)H_2(\omega)\exp(-j(\omega_1 - \omega_2)\tau)$$
$$= Tx(\omega + \omega_1)G(\omega + \omega_1)H_1(\omega) +$$
$$Tx(\omega + \omega_2)G(\omega + \omega_2)H_2(\omega)\exp(-j(\omega_1 - \omega_2)\tau)$$
$$= F(\omega)H_1(\omega)G(\omega + \omega_1)H_1(\omega) +$$
$$F(\omega)H_2(\omega)G(\omega + \omega_2)H_2(\omega)\exp(-j(\omega_1 - \omega_2)\tau)$$
$$= F(\omega)(H_1^2(\omega)\exp(-j(\omega + \omega_1)\tau + \theta_0) +$$
$$H_2^2(\omega)\exp(-j(\omega + \omega_1)\tau + \theta_0))$$
$$= F(\omega)(H_1^2(\omega) + H_2^2(\omega))\exp(-j(\omega + \omega_1)\tau + \theta_0))$$

That is, the modulated signal $F(\omega)$ is rotated by a phase $\exp(-j(\omega_1\tau+\theta_0))$ and delayed by time $\tau$ for demodulation.

Since the phase rotation and time delay can be adjusted by a carrier recovery circuit and a timing recovery circuit that are usually provided on the demodulation circuit 15, an undistorted modulated signal $F(\omega)$ can be extracted by the demodulation circuit 15.

The above description represents a case where the transfer function $G(\omega)$ is undistorted. On the contrary, if amplitude or the like of the transfer function $G(\omega)$ is not flat, the spectrum combination weighting function 1 and the spectrum combination weighting function 2 are selected or the spectrum division weighting function 1 and the spectrum division weighting function 2 are selected so that the amplitude becomes flat after combination, thus the distortion of the transmission path can be compensated.

In addition, a spectrum division weighting function and a spectrum combination weighting function that satisfy the present invention will be described in detail with reference to FIG. 19.

In order to satisfy the present invention, it suffices that, as described above, a pass band of the sum in the frequency domain of an overall transfer function 1 obtained by multiplying the spectrum division weighting function 1 and the spectrum combination weighting function 1 in the frequency domain, and an overall transfer function 2 obtained by multiplying the spectrum division weighting function 2 and the spectrum combination weighting function 2 in the frequency domain is flat with respect to the occupied spectrum of the modulated signal. For example, the characteristics resulting from frequency-shifting by $\omega_h$, a root roll-off filter with a roll-off factor $\alpha$ and a cut-off frequency $\omega_h$ is represented by the following formula where $\omega_x = \alpha\omega_h$:

$$H_1(\omega) = 1 \, (|\omega + \omega_h| < \omega_h - \omega_x) \quad (10\text{-}1)$$

$$H_1(\omega) = \sin(\pi(\omega_x - |\omega + \omega_h| + \omega_h)/4\omega_x)(\omega_h - \omega_x \leq |\omega + \omega_h| < \omega_h - \omega_x) \quad (10\text{-}2)$$

$$H_1(\omega) = 0 \, (|\omega + \omega_h| \geq 2\omega_h - \omega_x) \quad (10\text{-}3)$$

Here, for the sake of simplification, it is assumed that the transfer function $G(\omega)=1$, Formula (10) may be calculated with the spectrum division weighting function 1 and the spectrum combination weighting function 1.

Meanwhile, next, the characteristics resulting from frequency-shifting by $-\omega_h$, a root roll-off filter is represented by the following formula:

$$H_2(\omega) = 1 \, (|\omega + \omega_h| < \omega_h - \omega_x) \quad (11\text{-}1)$$

$$H_2(\omega) = \sin(\pi(\omega_x - |\omega - \omega_h| + \omega_h)/4\omega_x)(\omega_h - \omega_x \leq |\omega + \omega_h| < \omega_h - \omega_x) \quad (11\text{-}2)$$

$$H_2(\omega) = 0 \, (|\omega + \omega_h| \geq \omega_h - \omega_x) \quad (11\text{-}3)$$

Here, for the sake of simplification, it is assumed that the transfer function $G(\omega)=1$, Formula (11) may be calculated with the spectrum division weighting function 2 and the spectrum combination weighting function 2.

Accordingly, filter characteristics combining transmission and reception are represented as follows:

$$H_1^2(\omega) + H_2^2(\omega) = 1 \, (|\omega| < \omega_h(2-\alpha)) \quad (12\text{-}1)$$

$$H_1^2(\omega) + H_2^2(\omega) = \sin^2(\pi(\omega_x - |\omega - \omega_h| + \omega_h)/4\omega_x)(\omega_h)(2-\alpha) \leq \omega < \omega_h(2+\alpha)) \quad (12\text{-}2)$$

$$H_1^2(\omega) + H_2^2(\omega) = \sin^2(\pi(\omega_x - |\omega + \omega_h| + \omega_h)/4\omega_x)(-\omega_h)(2-\alpha) \geq \omega > -\omega_h(2+\alpha)) \quad (12\text{-}3)$$

$$H_1^2(\omega) + H_2^2(\omega) = 0 \, (|\omega| \geq \omega_h(2+\alpha)) \quad (12\text{-}4)$$

From Formula (9), the gain of the filter characteristics $H_1^2(\omega) + H_2^2(\omega)$ combining transmission and reception is 1 with $|\omega| < \omega_h (2+\alpha)$ (pass band). Accordingly, for the modulated signal $F(\omega)$ having an occupied spectrum of $|\omega| < \omega_h(2+\alpha)$, a signal transmission without waveform distortion is possible.

When the above-described spectrum division weighting function and spectrum combination weighting function are applied, a modulated signal can be divided in the frequency domain, and combined and demodulated on the reception side.

Note that, the above example is an example of spectrum division weighting function and spectrum combination weighting function, and is not limited to this filter function. That is, the above example is an example in which a modulated signal is equally divided into two signals, but the modulated signal may be divided into three or more signals, for example, seven signals, as shown in FIG. 20(*a*) depending on the situation of an unused frequency band, or may be divided into sub-spectrum signals with different bandwidths as shown in FIG. 20(*b*).

Figure 21:
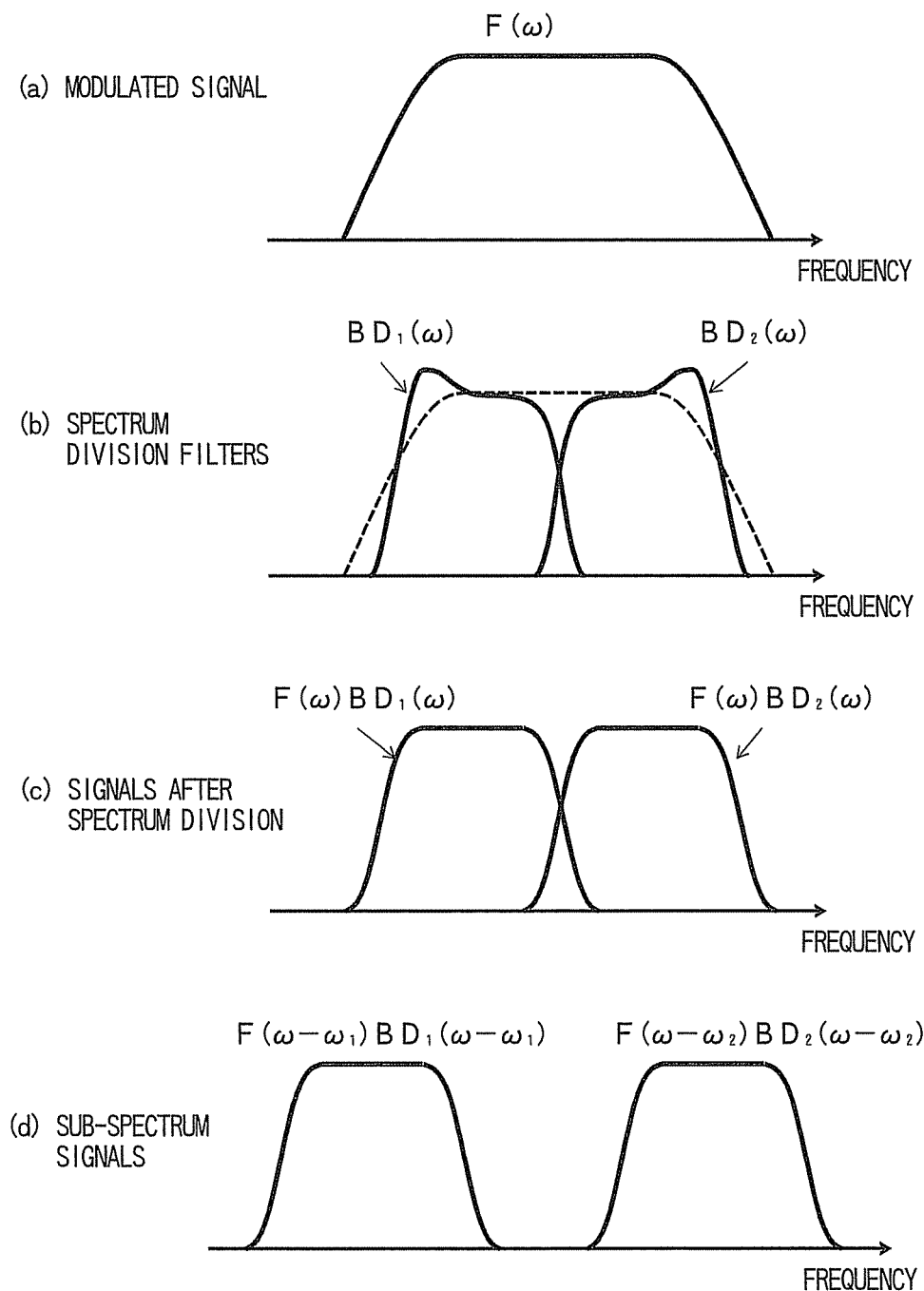
FIG. 21 are diagrams showing an example of transmitted signals obtained by dividing a modulated signal into two sub-spectrum signals.
Figure 22:
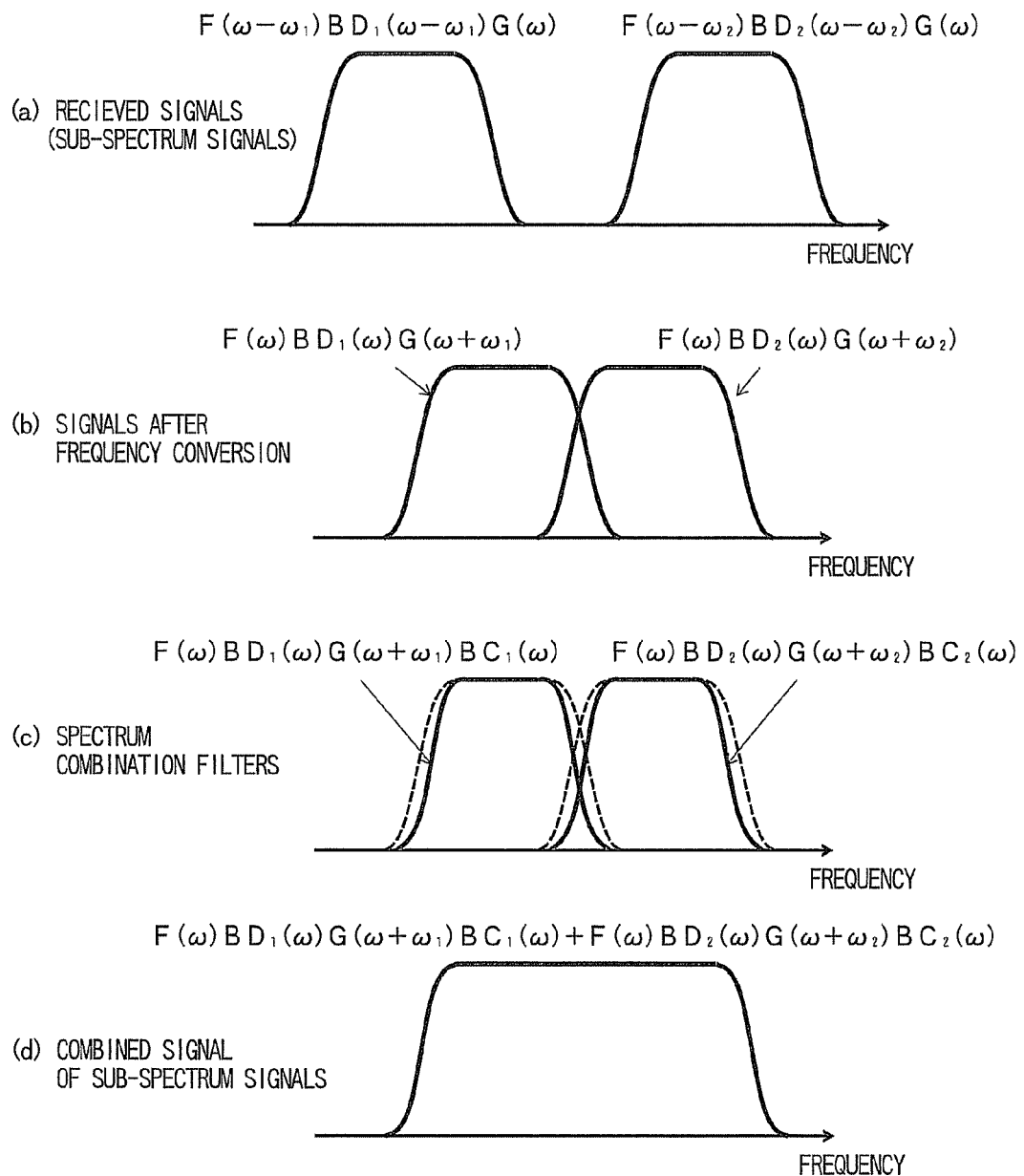
FIG. 22 are diagrams showing an example of a combined signal obtained by combining the two sub-spectrum signals of the received signals.
Figure 23:
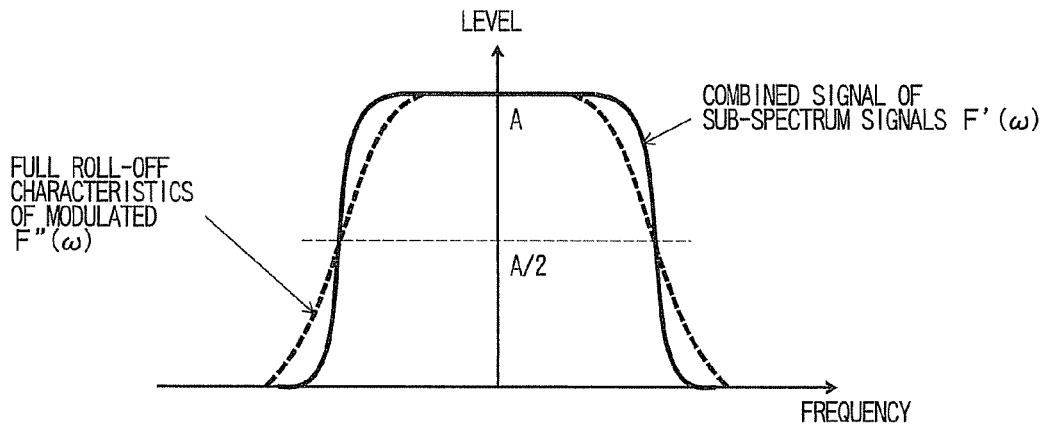
FIG. 23 is a diagram showing the combined signal of the sub-spectrum signals and the root roll-off characteristics of the modulated signal.

FIG. 21 show an example of transmitted signals obtained by dividing a modulated signal into two sub-spectrum signals. FIG. 22 show an example of a combined signal obtained by combining the two sub-spectrum signals of the received signals. FIG. 23 shows the combined signal of the sub-spectrum signals and the roll-off characteristics of the modulated signal.

In this example, a broadband modulated signal $F(\omega)$ is divided and transmitted by two narrow-band filters, and each of $$|F(\omega)BD_k(\omega)G(\omega+\omega_k)|$$

which is the absolute value of the product between the transmitted signal $F(\omega)BD(\omega)$ and the propagation path characteristics $G(\omega+\omega_K)$, and $|BC_k(\omega)|$, which is the absolute value of the spectrum combination weighting function, is the same root roll-off-function.

The division and combination of a transmitted signal using the spectrum division weighting function $BC_k(\omega)$ and the spectrum combination weighting function $BD_k(\omega)$ that satisfy the characteristics will now be described.

On the transmission side, when a modulated signal $F(\omega)$ shown in FIG. 21(*a*) is multiplied by the spectrum division weighting functions $BD_1(\omega)$ and $BD_2(\omega)$ shown in FIG. 21(*b*), the modulated signal is divided to generate two sub-spectrum signals $F(\omega)BD_1(\omega)$ and $F(\omega)BD_2(\omega)$ as shown in FIG. 21(*c*). Subsequently, when the center frequencies of the sub-spectrum signals resulting from division are shifted to respective predetermined frequencies $\omega_1$ and $\omega_2$, the transmitted signals shown in FIG. 21(*d*) are generated:

$$F(\omega-\omega_1)BD_1(\omega-\omega_1)$$

$$F(\omega-\omega_2)BD_2(\omega-\omega_2)$$

Meanwhile, on the reception side, a case is assumed where the transmitted signals shown in FIG. 21(*d*):

$$F(\omega-\omega_1)BD_1(\omega-\omega_1),$$

$$F(\omega-\omega_2)BD_1(\omega-\omega_2)$$

are affected by a transmission path $G(\omega)$, so as to become received signals shown in FIG. 22(*a*):

$$F(\omega-\omega_1)BD_1(\omega-\omega_1)G(\omega),$$

$$F(\omega-\omega_2)BD_2(\omega-\omega_2)G(\omega)$$

When these signals are frequency-converted, signals shown in FIG. 22(*b*) are obtained:

$$F(\omega)BD_1(\omega)G(\omega+\omega_1),$$

$$F(\omega)BD_2(\omega)G(\omega+\omega_2)$$

On the reception side, if a spectrum combination weighting function $BC_k(\omega)$ that satisfies $$|F(\omega)BD_k(\omega)G(\omega+\omega_k)|=|BC_k(\omega)| \quad (13)$$

is selected, and $|BC_k(\omega)|$ becomes a root roll-off function with the same roll-off factor as that of the spectrum of each sub-spectrum signal, then, after spectrum combination filtering, a signal with a waveform shown in FIG. 22(*c*) is obtained. Here, in FIG. 22(*c*), since each of $$F(\omega)BD_1(\omega)G(\omega+\omega_1)BC_1(\omega), \text{ and}$$

$$F(\omega)BD_2(\omega)G(\omega+\omega_2)BC_2(\omega)$$

satisfies full roll-off characteristics, the sum of the levels of the transition regions where the two sub-spectrum signals overlap becomes equal to the level of the band pass. Accordingly, as shown in FIG. 22(*d*), the spectrum $F'(\omega)$ where the sub-spectrum signals are combined would also satisfy the full roll-off characteristics.

In addition, the relationship of the waveform $F'(\omega)$ of FIG. 22(*d*) of the combined sub-spectrum signals, and the full roll-off characteristics $F''(\omega)$ of the transmitted signal in FIG. 21(*a*) is shown in FIG. 23.

Although $F'(\omega)$ and $F''(\omega)$ each satisfy the roll-off characteristics, the transition region of the roll-off function is steeper for $F'(\omega)$, as shown in FIG. 21(*b*), since, at the time of spectrum division, multiplication is performed by a spectrum division weighting function having a steeper transition region than that of the modulated signal. That is, as shown in FIG. 23, the spectrum has an equivalent shape with a smaller roll-off factor than that of the modulated signal $F''(\omega)$. On the demodulation side, regardless of the roll-off factor, Nyquist timing with no Intersymbol interference can be extracted as long as the full roll-off characteristics are satisfied, such that, a signal obtained by combining the sub-spectrum signals can be used to perform demodulation without degradation of the characteristics.

In this case, since the signal $F'(\omega)$ obtained by combining the sub-spectrum signals already satisfies the full roll-off characteristics, subsequent spectrum shaping filtering is not required, thus the Rx spectrum shaping filter 14*h* in the spectrum combination filter bank 14 shown in FIGS. 6 and 8 is not required.

Figure 24:
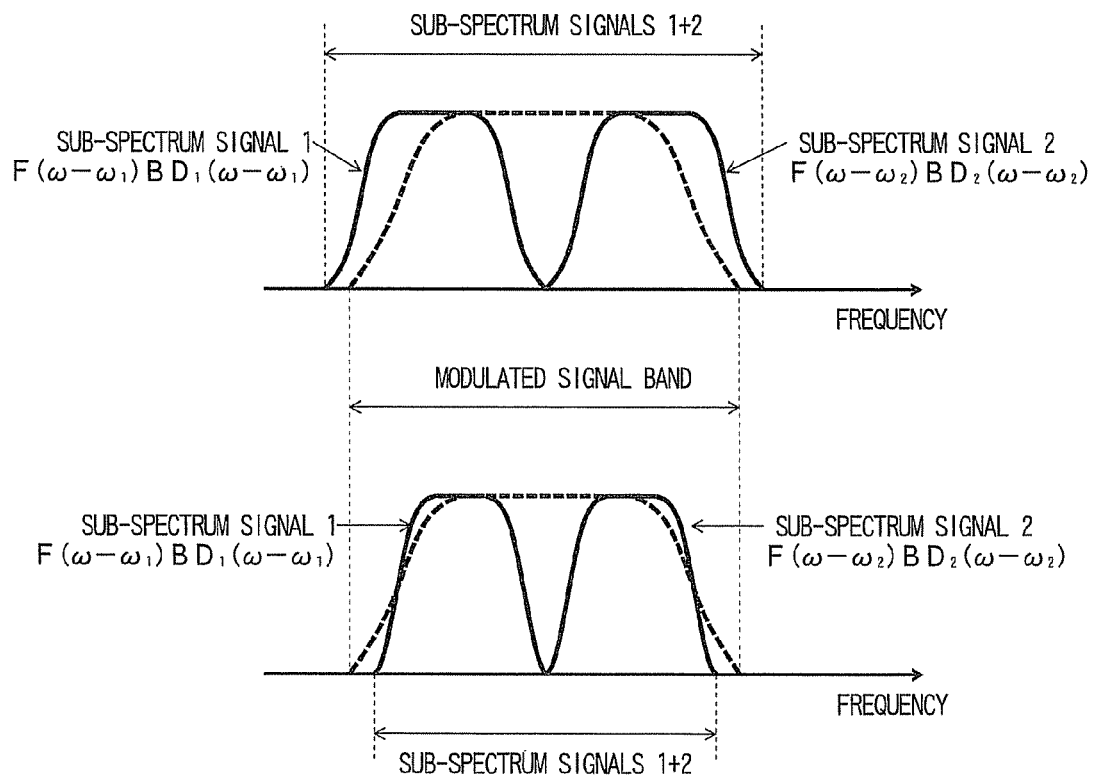
FIG. 24 are diagrams showing an example of a comparison between the band of a modulated signal $F(\omega)$ and the sum of the bands occupied by the sub-spectrum signals.
Figure 25:
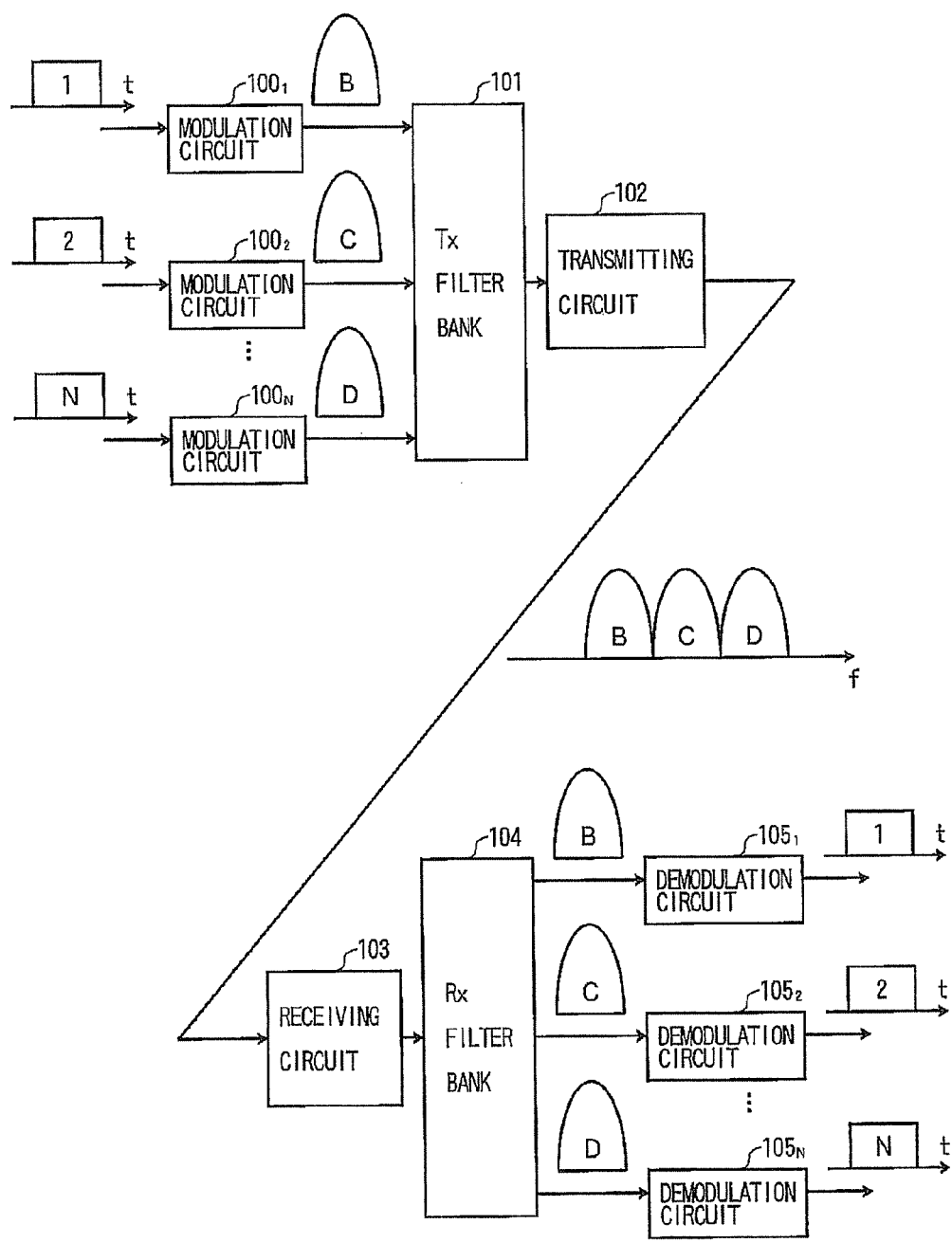
FIG. 25 is a block diagram showing a first exemplary configuration of a conventional multicarrier transmission system.
Figure 26:
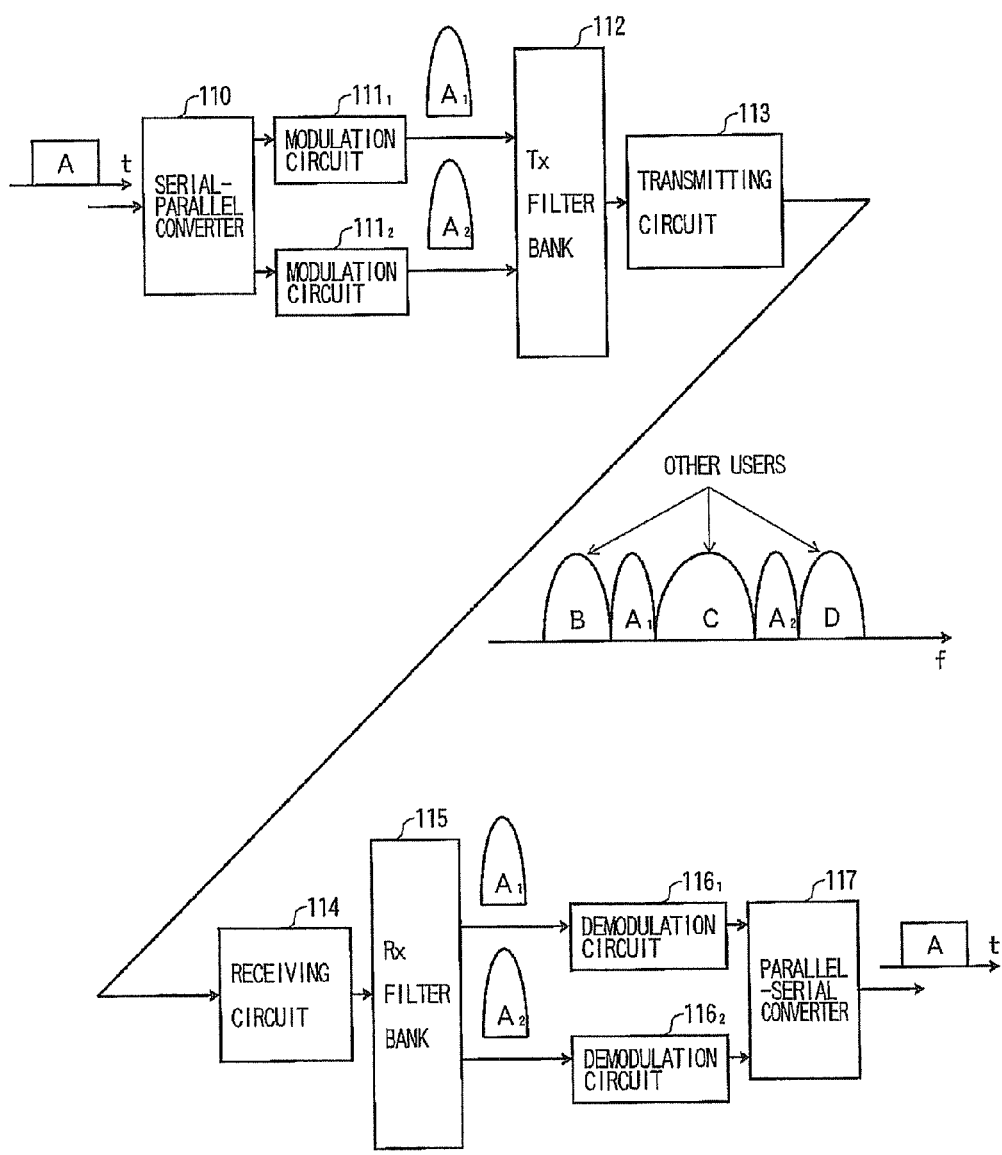
FIG. 26 is a block diagram showing a second exemplary configuration of the conventional multicarrier transmission system.

FIG. 24 show an example of a comparison between the band of a modulated signal $F(\omega)$ and the sum of the bands occupied by the sub-spectrum signals.

The band occupied by the sub-spectrum signal is the product of the spectrum division weighting function $BD_k(\omega)$ and the modulated signal $F(\omega)$ as shown in FIG. 21(*c*). Accordingly, by appropriately selecting $BD_k(\omega)$, the bandwidth of the sub-spectrum signal can be adjusted. For example, when a steep function having a narrower transition region than that of the pass band is selected as $BD_k(\omega)$, each sub-spectrum signal is a steep function in which the pass band is broad and the transition region is narrow, as shown in FIG. 24(*b*). In this case, since the sub-spectrum signal becomes close to a rectangular wave, the sum of the signal bands of the sub-spectrum signals 1 and 2 can also be made narrower than the band of the modulated signal $F(\omega)$. Note that FIG. 24(*a*) shows a case in which the sum of the occupied spectrum of the sub-spectrum signal is broader than the band of the modulated signal $F(\omega)$.

As described above, by selecting the spectrum division weighting function $BD_k(\omega)$, the total band width required for the transmission may become be equal to or less than the occupied spectrum width of the modulated signal, thus allowing the frequency utilization efficiency to be improved.

The many features and advantages of the embodiments are apparent from the detailed specification and, thus, it is intended by the appended claims to cover all such features and advantages of the embodiments that fall within the true spirit and scope thereof. Further, since numerous modifications and changes will readily occur to those skilled in the art, it is not desired to limit the inventive embodiments to exact construction and operation illustrated and described, and accordingly all suitable modifications and equivalents may be resorted to, falling within the scope thereof.

The invention claimed is:
1. A wireless transmission system which transmits and receives a single carrier modulated signal between a transmitter and a receiver that are coupled through a wireless transmission path, wherein the transmitter comprises a spectrum division filter bank that includes a Fourier transform unit converting the single carrier modulated signal to a frequency domain, a frequency allocation unit generating from the single carrier modulated signal in the frequency domain a plurality of sub-spectrum signals, each of which is arranged at a predetermined frequency position, and an inverse Fourier transform unit converting the sub-spectrum signals to time domain to produce a time domain signal, the transmitter using the time domain signal subjects the plurality of sub-spectrum signals arranged in spectra to a direct spectrum division transmission, and the receiver comprises a spectrum combination filter bank extracting the plurality of sub-spectrum signals from received signals arranged in spectra and subjected to the direct spectrum division transmission to combine the sub-spectrum signals into an original single carrier modulated signal.

2. The wireless transmission system according to claim 1, wherein the spectrum division filter bank further includes:

a plurality of spectrum division units dividing an output from the Fourier transform unit and outputting the plurality of sub-spectrum signals;

a plurality of frequency shift units shifting each of the plurality of sub-spectrum signals output from the plurality of spectrum division units to the predetermined frequency position;

an addition unit performing an addition of outputs from the plurality of frequency shift units, and arranging each of the outputs at the predetermined frequency position; and wherein the inverse Fourier transform unit converts an output from the addition unit to time domain.

3. The wireless transmission system according to claim 1, wherein the spectrum division filter bank further includes:

a plurality of frequency shift units each shifting an output from the Fourier transform unit to the predetermined frequency position;

a plurality of spectrum division units dividing each output from the plurality of frequency shift units and outputting the plurality of sub-spectrum signals;

an addition unit performing an addition of outputs from the plurality of spectrum division units, and arranging each of the outputs at the predetermined frequency position; and wherein the inverse Fourier transform unit converts an output from the addition unit to time domain.

4. The wireless transmission system according to claim 1, wherein the spectrum combination filter bank includes:

a Fourier transform unit converting the received signals to frequency domain;

a plurality of spectrum extraction units dividing an output from the Fourier transform unit and extracting the plurality of sub-spectrum signals;

a plurality of frequency shift units shifting each of the plurality of sub-spectrum signals output from the plurality of spectrum extraction units to an original frequency position where each of the sub-spectrum signals is at before arranged to the predetermined frequency position;

an addition unit performing an addition of outputs from the plurality of frequency shift units, and combining the outputs at the original frequency position; and an inverse Fourier transform unit converting an output from the addition unit to time domain.

5. The wireless transmission system according to claim 1, wherein the spectrum combination filter bank includes:

a Fourier transform unit converting the received signals to frequency domain;

a plurality of frequency shift units each shifting an output from the Fourier transform unit from the predetermined frequency position to an original frequency position where each of the sub-spectrum signals is at before arranged to the predetermined frequency position;

a plurality of spectrum extraction units dividing each output from the plurality of frequency shift units and extracting the plurality of sub-spectrum signals;

an addition unit performing an addition of outputs from the plurality of spectrum extraction units, and combining the outputs at the original frequency position; and an inverse Fourier transform unit converting an output from the addition unit to time domain.

6. The wireless transmission system according to claim 1, wherein the transmitter and the receiver transmit the plurality of sub-spectrum signals through respective wireless transmission paths.

7. The wireless transmission system according to claim 6, wherein the spectrum division filter bank includes:

a the Fourier transform unit converting the single carrier modulated signal to frequency domain;

a plurality of spectrum division units dividing an output from the Fourier transform unit and outputting the plurality of sub-spectrum signals;

a plurality of frequency shift units shifting each of the plurality of sub-spectrum signals output from the plurality of spectrum division units to the predetermined frequency position, and outputting each of the plurality of sub-spectrum signals arranged at the predetermined frequency position; and a plurality of inverse Fourier transform units converting each output from the plurality of frequency shift units to time domain.

8. The wireless transmission system according to claim 6, wherein the spectrum division filter bank includes:

a the Fourier transform unit converting the single carrier modulated signal to frequency domain;

a plurality of frequency shift units each shifting an output from the Fourier transform unit to the predetermined frequency position;

a plurality of spectrum division units dividing each output from the plurality of frequency shift units and outputting each of the plurality of sub-spectrum signals arranged at the predetermined frequency position; and a plurality of inverse Fourier transform units converting each output from the plurality of spectrum division units to time domain.

9. The wireless transmission system of any of claim 2, 3, 7 or 8, wherein the spectrum division units each multiply the single carrier modulated signal by more than one spectrum division weighting function $BD_k(\omega)$ to generate N sub-spectrum signals $Sb_k(\omega)$, where k represents a natural number from 1 to N, N represents the number of divided spectra and co represents a frequency.

10. The wireless transmission system according to claim 9, wherein an overall transfer function $BT_k(\omega)$ being a product of the spectrum division weighting function $BD_k(\omega)$ and the spectrum combination weighting function $BC_k(\omega)$ is represented in an occupied spectrum of the single carrier modulated signal as follows:

$$\Sigma |BT_k(\omega)G(\omega+\omega_k)|=A$$

where A represents a constant and $\omega_k$ represents a value determined by the frequency allocation of the sub-spectrum signal.

11. The wireless transmission system according to claim 9, wherein
the spectrum division weighting function $BD_k(\omega)$ and the spectrum combination weighting function $BC_k(\omega)$ making up a pair are both the same root roll-off function.

12. The wireless transmission system according to claim 9, wherein
a product of a mean frequency spectrum $F(\omega)$ of the single carrier modulated signal and the spectrum division weighting function $BD_k(\omega)$ satisfies $$|F(\omega)BD_k(\omega)G(\omega+\omega_k)|=|BC_k(\omega)|$$

and the spectrum combination weighting function $BC_k(\omega)$ is a root roll-off function.

13. The wireless transmission system according to claim 6, wherein
the spectrum combination filter bank includes:
a plurality of Fourier transform units converting each of received signals transmitted through the plurality of wireless transmission paths to frequency domain;
a plurality of spectrum extraction units dividing each output from the plurality of Fourier transform units and extracting the plurality of sub-spectrum signals;
a plurality of frequency shift units shifting each of the plurality of sub-spectrum signals output from the plurality of spectrum extraction units to an original frequency position where each of the sub-spectrum signals is at before assigned to the predetermined frequency position;
an addition unit performing an addition of outputs from the plurality of frequency shift units, and combining the outputs at the original frequency position; and
an inverse Fourier transform unit converting an output from the addition unit to time domain.

14. The wireless transmission system according to claim 6, wherein
the spectrum combination filter bank includes:
a plurality of Fourier transform units converting each of received signals transmitted through the plurality of wireless transmission paths to frequency domain;
a plurality of frequency shift units shifting each output from the plurality of Fourier transform units from the predetermined frequency position to an original frequency position where each of the sub-spectrum signals is at before assigned to the predetermined frequency position;
a plurality of spectrum extraction units dividing each output from the plurality of frequency shift units and extracting the plurality of sub-spectrum signals;
an addition unit performing an addition of outputs from the plurality of spectrum extraction units, and combining the outputs at the original frequency position; and
an inverse Fourier transform unit converting an output from the addition unit to time domain.

15. The wireless transmission system of any of claim 4, 5, 13 or 14, wherein
the spectrum extraction units each multiply N sub-spectrum signals $Sb_k(\omega)$, contained in the received signals by a spectrum combination weighting function $BC_k(\omega)$ corresponding to a transfer function $G(\omega)$ between the transmitter and the receiver and the spectrum division weighting function $BD_k(\omega)$.

16. The wireless transmission system according to claim 15, wherein
a product of a mean frequency spectrum $F(\omega)$ of the single carrier modulated signal and the spectrum division weighting function $BD_k(\omega)$ satisfies $$|F(\omega)BD_k(\omega)G(\omega+\omega_k)|=|BC_k(\omega)|$$

and the spectrum combination weighting function $BC_k(\omega)$ is a root roll-off function.

17. A wireless transmission method which transmits and receives a single carrier modulated signal between a transmitter and a receiver that are coupled through a wireless transmission path, wherein
the transmitter uses a spectrum division filter bank that performs a Fourier transform to convert the single carrier modulated signal to a frequency domain, that performs frequency allocation to generate from the single carrier modulated signal in the frequency domain a plurality of sub-spectrum signals, each of which is arranged at a predetermined frequency position, and that performs an inverse Fourier transform to convert the sub-spectrum signals to time domain to produce a time domain signal,
the transmitter uses the time domain signal to subject the plurality of sub-spectrum signals arranged in spectra to a direct spectrum division transmission, and
the receiver uses a spectrum combination filter bank to extract the plurality of sub-spectrum signals from received signals arranged in spectra and subjected to the direct spectrum division transmission to combine the sub-spectrum signals into an original single carrier modulated signal, which is in turn subjected to demodulation processing.

18. The wireless transmission method according to claim 17, wherein
the spectrum division filter bank
divides the frequency domain single carrier modulated signal and outputs the plurality of sub-spectrum signals;
shifts each of the plurality of sub-spectrum signals to the predetermined frequency position;
performs an addition of the shifted plurality of sub-spectrum signals arranged at the predetermined frequency position; and
converts the added shifted plurality of sub-spectrum signals arranged at the predetermined frequency position to time domain by performing an inverse Fourier transform.

19. The wireless transmission method according to claim 17, wherein
the spectrum division filter bank
shifts the frequency domain signal carrier modulated signal to a plurality of frequency shifted signals;
divides each of the plurality of frequency shifted signals and uses the divided signals to output the plurality of sub-spectrum signals;
performs an addition of the plurality of sub-spectrum signals, and arranges the resulting sum at the predetermined frequency; and
converts the resulting sum to time domain by performing an inverse Fourier transform.

20. The wireless transmission method according to claim 17, wherein
the spectrum combination filter bank
converts the received signals to frequency domain by a Fourier transform unit;

divides an output from the Fourier transform unit and extracts the plurality of sub-spectrum signals by a plurality of spectrum extraction units;

shifts each of the plurality of sub-spectrum signals output from the plurality of spectrum extraction units to an original frequency position where each of the sub-spectrum signals is at before assigned to the predetermined frequency position by a plurality of frequency shift units;

performs an addition of outputs from the plurality of frequency shift units, and combines the outputs at the original frequency position by an addition unit; and converts an output from the addition unit to time domain by an inverse Fourier transform unit.

21. The wireless transmission method according to claim 17, wherein the spectrum combination filter bank converts the received signals to frequency domain by a Fourier transform unit;

shifts an output from the Fourier transform unit from the predetermined frequency position to an original frequency position where each of the sub-spectrum signals is at before assigned to the predetermined frequency position by each of a plurality of frequency shift units;

divides each output from the plurality of frequency shift units and extracts the plurality of sub-spectrum signals by a plurality of spectrum extraction units;

performs an addition of outputs from the plurality of spectrum extraction units, and combines the outputs at the original frequency position by an addition unit; and converts an output from the addition unit to time domain by an inverse Fourier transform unit.

22. The wireless transmission method according to claim 17, wherein the transmitter and the receiver transmit the plurality of sub-spectrum signals through respective wireless transmission paths.

23. The wireless transmission method according to claim 22, wherein the spectrum division filter bank converts the single carrier modulated signal to frequency domain by a Fourier transform unit;

divides an output from the Fourier transform unit and outputs the plurality of sub-spectrum signals by a plurality of spectrum division units;

shifts each of the plurality of sub-spectrum signals to the predetermined frequency position, and outputs each of the plurality of sub-spectrum signals arranged at the predetermined frequency position by a plurality of frequency shift units; and converts each output from the plurality of frequency shift units to time domain by a plurality of inverse Fourier transform units.

24. The wireless transmission method according to claim 22, wherein the spectrum division filter bank converts the single carrier modulated signal to frequency domain by a Fourier transform unit;

shifts an output from the Fourier transform unit to the predetermined frequency position by each of a plurality of frequency shift units;

divides each output from the plurality of frequency shift units and outputs each of the plurality of sub-spectrum signals arranged at the predetermined frequency position by a plurality of spectrum division units; and converts each output from the plurality of spectrum division units to time domain by a plurality of inverse Fourier transform units.

25. The wireless transmission method according to claim 22, wherein the spectrum combination filter bank converts each of received signals transmitted through the plurality of wireless transmission paths to frequency domain by a plurality of Fourier transform units;

divides an output from the Fourier transform unit and extracts the plurality of sub-spectrum signals by a plurality of spectrum extraction units;

shifts each of the plurality of sub-spectrum signals output from the plurality of spectrum extraction units to an original frequency position where each of the sub-spectrum signals is at before assigned to the predetermined frequency position by a plurality of frequency shift units;

performs an addition of outputs from the plurality of frequency shift units, and combines the outputs at the original frequency position by an addition unit; and converts an output from the addition unit to time domain by an inverse Fourier transform unit.

26. The wireless transmission method according to claim 22, wherein the spectrum combination filter bank converts each of received signals transmitted through the plurality of wireless transmission paths to frequency domain by a plurality of Fourier transform units;

shifts each output from the plurality of Fourier transform units from the predetermined frequency position to an original frequency position where each of the sub-spectrum signals is at before assigned to the predetermined frequency position by a plurality of frequency shift units;

divides each output from the plurality of frequency shift units and extracts the plurality of sub-spectrum signals by a plurality of spectrum extraction units;

performs an addition of outputs from the plurality of spectrum extraction units, and combines the outputs at the original frequency position by an addition unit; and converts an output from the addition unit to time domain by an inverse Fourier transform unit.

* * * * *